(12) United States Patent
Whelan et al.

(10) Patent No.: US 9,298,269 B2
(45) Date of Patent: Mar. 29, 2016

(54) IDENTIFYING MOVEMENTS USING A MOTION SENSING DEVICE COUPLED WITH AN ASSOCIATIVE MEMORY

(71) Applicant: The Boeing Company, Chicago, IL (US)

(72) Inventors: John Desmond Whelan, Burien, WA (US); Leonard Jon Quadracci, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 96 days.

(21) Appl. No.: 14/249,786

(22) Filed: Apr. 10, 2014

(65) Prior Publication Data

US 2015/0293593 A1   Oct. 15, 2015

(51) Int. Cl.
*G06F 3/01* (2006.01)
*G06K 9/00* (2006.01)
*G06F 12/08* (2006.01)

(52) U.S. Cl.
CPC ............ *G06F 3/017* (2013.01); *G06F 12/0864* (2013.01); *G06K 9/00201* (2013.01); *G06K 9/00342* (2013.01); *G06F 2212/6032* (2013.04)

(58) Field of Classification Search
CPC ....................................................... G06F 3/013
See application file for complete search history.

(56) References Cited

U.S. PATENT DOCUMENTS

| | | |
|---|---|---|
| 4,144,564 A | 3/1979 | Lamb |
| 4,149,262 A | 4/1979 | Lamb et al. |
| 5,014,327 A | 5/1991 | Potter et al. |
| 2009/0083207 A1 | 3/2009 | Aparicio, IV |
| 2011/0128223 A1* | 6/2011 | Lashina ................. G06F 3/013 345/158 |
| 2011/0199291 A1 | 8/2011 | Tossell et al. |
| 2011/0234854 A1 | 9/2011 | Kimura |
| 2012/0146789 A1 | 6/2012 | De Luca et al. |

FOREIGN PATENT DOCUMENTS

WO   WO2013027091 A1   2/2013

OTHER PUBLICATIONS

Prokopenko et al., "Optimizing Associative Information Transfer Within Content-addressable Memory," International Journal of Unconventional Computation, vol. 3, Issue 3, Special issue: "Towards Theory of Unconventional Computing," 2008, pp. 273-296.
Extended European Search Report, dated Nov. 23, 2015, regarding Application No. 15156581.9, 11 pages.

* cited by examiner

*Primary Examiner* — Gerald Johnson
(74) *Attorney, Agent, or Firm* — Yee & Associates, P.C.

(57) ABSTRACT

A kinematic system. The system includes a kinematic measurement device having one or more sensors configured to detect a plurality of physical positions of a part of an object. The system also includes an associative memory, in communication with the kinematic measurement device, and comprising a plurality of data and a plurality of associations among the plurality of data, wherein the plurality of data is collected into associated groups, wherein the associative memory is configured to be queried based on at least indirect relationships among the plurality of data. The system also includes a processor, in communication with the associative memory and the kinematic measurement device, and configured to translate a range of coordinate positions of the part of the object to a qualitative description that names the range, wherein the processor is further configured to provide the qualitative description to the associative memory for storage.

16 Claims, 17 Drawing Sheets

| | | LOW | | MED | | HIGH |
|---|---|---|---|---|---|---|
| | ○○○ | | | | | |
| + | DISTANCE_FROM_HEAD_TO_ELBOW_RIGHT | ☐ | ☐ | ☐ | ☑ | ☐ |
| + | DISTANCE_FROM_HEAD_TO_HAND_LEFT | ☐ | ☐ | ☐ | ☐ | ☑ |
| + | DISTANCE_FROM_HEAD_TO_HAND_RIGHT | ☐ | ☐ | ☐ | ☐ | ☑ |
| + | DISTANCE_FROM_HEAD_TO_SHOULDER_LEFT | ☐ | ☐ | ☑ | ☐ | ☐ |
| + | DISTANCE_FROM_HEAD_TO_SHOULDER_RIGHT | ☐ | ☐ | ☑ | ☐ | ☐ |
| + | DISTANCE_FROM_HEAD_TO_WRIST_LEFT | ☐ | ☐ | ☐ | ☐ | ☐ |
| | ○○○ | | | | | |

1300

ENTITIES LIKE: UNKNOWN MOVEMENT

| | SCORE LABEL | COMMON ATTRIBUTES |
|---|---|---|
| 1.00 | UNDESIRABLE-3 (1302) | _CENTER_BOTTOM_EXTREMELY_SOUTH_MODERATELY_NEAREST_EAST; _CENTER_MIDDLE_SOMEWHAT_NEAR_SOUTH_EXTREMELY_NEAREST_WEST; _LEFT_BOTTOM_MODERATELY_NEAREST_NORTH_MODERATELY_NEARER_EAST; _CENTER_BOTTOM_MODERATELY_SOUTH_FAIRLY_WEST; _CENTER_BOTTOM_SOMEWHAT_NORTH_NEAREST_WEST; _CENTER_BOTTOM_MODERATELY_SOUTH_EXTREMELY_NEAREST_WEST; _CENTER_MIDDLE_EXTREMELY_NEAREST_SOUTH_MODERATELY_NEAREST_WEST; _LEFT_BOTTOM_EXTREMELY_NORTH_NEAR_EAST |
| 0.47 | UNDESIRABLE-1 | _CENTER_BOTTOM_EXTREMELY_NORTH_EXTREMELY_EAST; _CENTER_MIDDLE_EXTREMELY_SOUTH_EAST; _CENTER_BOTTOM_MODERATELY_NORTH_NEARER_EAST; _CENTER_MIDDLE_FAIRLY_NEARER_SOUTH_EXTREMELY_EAST; _CENTER_MIDDLE_NEAREST_SOUTH_EXTREMELY_NEAREST_EAST |
| 0.45 | UNDESIRABLE-4 | _CENTER_BOTTOM_MODERATELY_NORTH_NEARER_EAST; _CENTER_MIDDLE_EXTREMELY_NEAREST_SOUTH_SOMEWHAT_NEARER_EAST; _LEFT_BOTTOM_MODERATELY_NEAREST_NORTH_MODERATELY_NEARER_EAST; _CENTER_BOTTOM_EXTREMELY_SOUTH_MODERATELY_NEAREST_WEST; _CENTER_MIDDLE_SOMEWHAT_NEAR_SOUTH_EXTREMELY_NEAREST_WEST |
| 0.18 | UNDESIRABLE-2 | _CENTER_MIDDLE_FAIRLY_NEARER_SOUTH_EXTREMELY_EAST; _CENTER_BOTTOM_EXTREMELY_NORTH_EXTREMELY_EAST |

FIG. 13

OUTCOME ▶ LIKE: UNKNOWN MOVEMENT

| SCORE | OUTCOME | COMMON ATTRIBUTES |
|---|---|---|
| 1.00 | DESIRABLE (1402) | _CENTER_MIDDLE_FAIRLY_NORTH_NEAR_EAST;<br>_CENTER_MIDDLE_FAIRLY_SOUTH_SOMEWHAT_NEAR_EAST;<br>_CENTER_MIDDLE_SOMEWHAT_NEAREST_SOUTH_NEAREST_EAST;<br>_CENTER_MIDDLE_SOMEWHAT_SOUTH_FAIRLY_NEARER_WEST;<br>_CENTER_MIDDLE_NEARER_SOUTH_EXTREMELY_NEAREST_EAST;<br>_CENTER_MIDDLE_EXTREMELY_SOUTH_NEARER_WEST;<br>_CENTER_BOTTOM_SOMEWHAT_NEAREST_NORTH_SOMEWHAT_NEARER_EAST;<br>_LEFT_MIDDLE_FAIRLY_SOUTH_SOMEWHAT_FARTHER_EAST;<br>_CENTER_MIDDLE_FAIRLY_NEAREST_WEST;<br>_CENTER_MIDDLE_NEARER_SOUTH_NEAR_EAST;<br>_CENTER_BOTTOM_FAIRLY_NEARER_NORTH_MODERATELY_NEAREST_WEST;<br>_CENTER_BOTTOM_MODERATELY_SOUTH_MODERATELY_WEST |
| 0.52 | UNDESIRABLE (1404) | _CENTER_BOTTOM_MODERATELY_SOUTH_MODERATELY_WEST |

IDENTIFYING MOVEMENTS USING A MOTION SENSING DEVICE COUPLED WITH AN ASSOCIATIVE MEMORY

BACKGROUND INFORMATION

1. Field

The present disclosure relates generally to associative memories and, in particular, a system and method for identifying movements using a motion sensing device coupled with an associative memory.

2. Background

Detecting an individual's movements for the purpose of providing feedback to that individual concerning their movements can be very challenging, as there are many obstacles to be overcome. For example, the kinematic measuring device used to measure the position of a human body should capture enough relevant information so that an accurate decision can be made concerning a particular movement. Additionally, the information captured should be concise and analyzed quickly, so that the information can be relayed back to the individual in real time. Still further, the system should be able to function in a real world environment, where people are unpredictable and their movements are often sporadic. These and other issues are addressed by the illustrative embodiments described below.

SUMMARY

The illustrative embodiments provide for a kinematic system. The system includes a kinematic measurement device having one or more sensors configured to detect a plurality of physical positions of a part of an object. The system also includes an associative memory, in communication with the kinematic measurement device, and comprising a plurality of data and a plurality of associations among the plurality of data, wherein the plurality of data is collected into associated groups, wherein the associative memory is configured to be queried based on at least indirect relationships among the plurality of data. The system also includes a processor, in communication with the associative memory and the kinematic measurement device, and configured to translate a range of coordinate positions of the part of the object to a qualitative description that names the range, wherein the processor is further configured to provide the qualitative description to the associative memory for storage.

The illustrative embodiments also provide for a method. The method includes detecting, quantitatively, a physical position of a part of an object using a kinematic measurement device, wherein a quantitative measurement is taken. The method also includes translating, using a processor in communication with the kinematic measurement device, the quantitative measurement to a qualitative description of the physical position. The method also includes providing the qualitative description to an associative memory comprising a plurality of data and a plurality of associations among the plurality of data, wherein the plurality of data is collected into associated groups, wherein the associative memory is configured to be queried based on at least indirect relationships among the plurality of data, the associative memory embodied on a non-transitory computer readable storage medium.

The illustrative embodiments also provide for a computer. The computer includes a kinematic measurement device configured to detect, quantitatively, a physical position of a part of an object by taking a quantitative measurement of the object. The computer also includes a processor in communication with the kinematic measurement device, the processor configured to translate the quantitative measurement to a qualitative description of the physical position. The computer also includes an associative memory in communication with the processor, the associative memory configured to store the qualitative description, the associative memory comprising a plurality of data and a plurality of associations among the plurality of data, wherein the plurality of data is collected into associated groups, wherein the associative memory is configured to be queried based on at least indirect relationships among the plurality of data, the associative memory embodied on a non-transitory computer readable storage medium. The processor is further configured to compare the qualitative description to a set of movements for the object. The processor is further configured to determine a particular movement of the object based on the qualitative description.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 13 illustrates an example of an entity comparison, in accordance with an illustrative embodiment;

FIG. 14 illustrates an example of an entity comparison with an outcome as a result category, in accordance with an illustrative embodiment;

DETAILED DESCRIPTION

Figure 1:
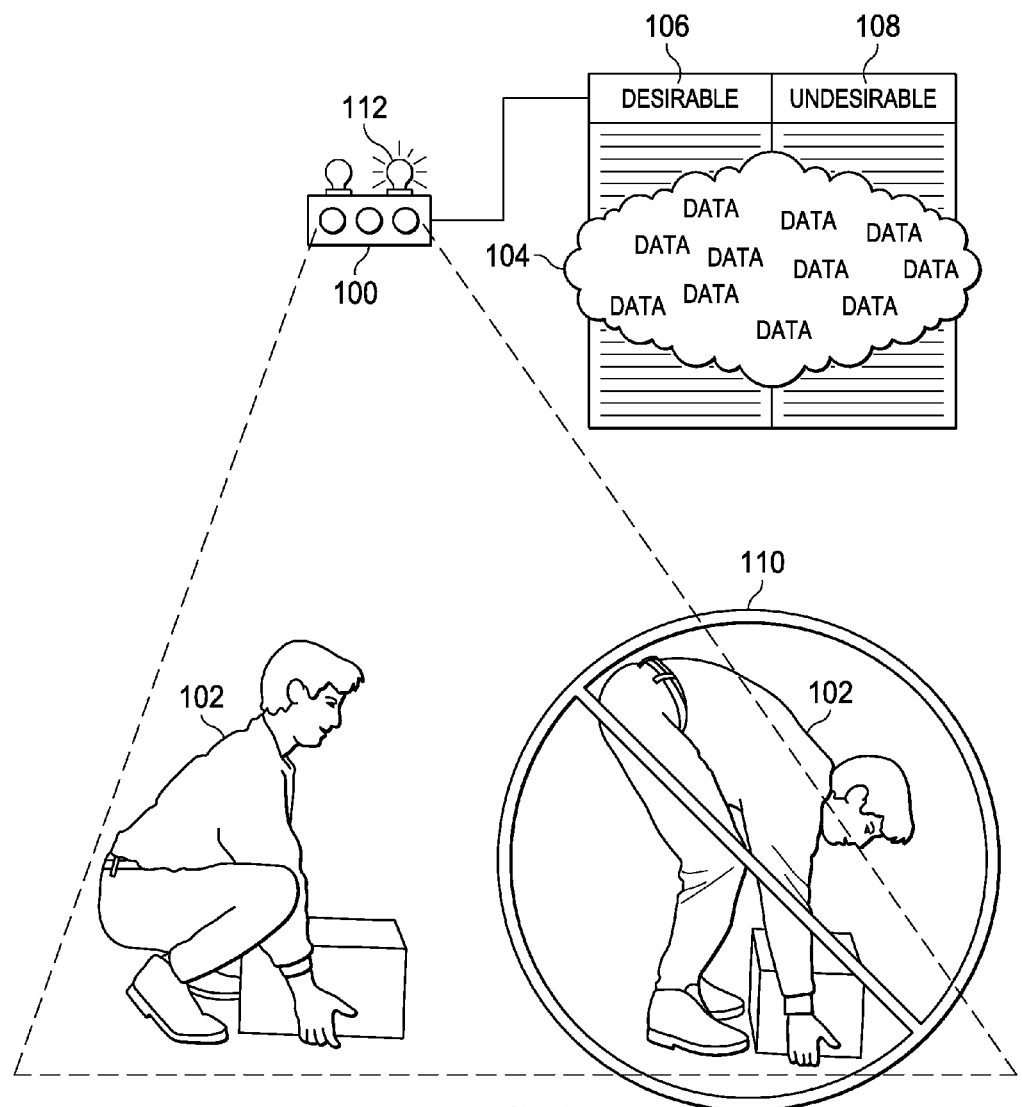
FIG. 1 illustrates one use of a kinematic detection system, in accordance with an illustrative embodiment.

The illustrative embodiments provide several useful functions. For example, the illustrative embodiments recognize and take into account that kinematic measurement devices may be data intensive and thus not desirable for certain applications. For example, if one desired to use a hand-portable computer to measure positions of a person and then alert that person if a movement or set of movements was considered undesirable, then using raw kinematic data for this application may be problematic.

The illustrative embodiments also recognize and take into account that associative memories are useful for comparing qualitative data items. For example, an associative memory can compare a group of terms known to the associative memory to an unknown term and determine which member of the group most closely matches the unknown term. The illustrative embodiments take advantage of this capability by translating quantitative kinematic measurements to qualitative terms, storing the qualitative terms in an associative memory, and then using the associative memory to determine, in qualitative terms, what movements have been detected.

The illustrative embodiment solves the issues of capturing enough data, speed of processing, and accounting for a user's sometimes sporadic movements by using an associative memory to classify movements obtained through a motion sensor with previous recordings of desired and undesired movements. In some illustrative embodiments, the user need only demonstrate a good and a bad movement to train the system to learn the mechanics of both. Then, the system can be moved from area to area to track different movements of the user with very little overhead, in terms of processing power.

By analogy, the illustrative embodiments could work like an active speed sign on a residential street. Drivers see the posted speed and their actual speed. The discrepancy of the two speeds could be enough to persuade the driver to slow down. After a time, the active speed sign can be removed because the community has learned a new behavior. Likewise, the user may be reminded to avoid undesirable movements and instead replace them with desirable movements.

Attention is now turned to the term "associative memory". As used herein, the term "associative memory" refers to a plurality of data and a plurality of associations among the plurality of data. The plurality of data and the plurality of associations may be stored in a non-transitory computer readable storage medium. The plurality of data may be collected into associated groups. The associative memory may be configured to be queried based on at least indirect relationships among the plurality of data in addition to direct correlations among the plurality of data. The associative memory may also be configured to be queried based on direct relationships, as well as combinations of direct and indirect relationships.

Associative memory technology is the process by which information is collected into associated groups in the interest of gaining new insight based on relationships rather than direct correlation. An associative memory may be characterized as a plurality of data and a plurality of associations among the plurality of data. The plurality of data may be collected into associated groups. Further, the associative memory may be configured to be queried based on at least one relationship, selected from a group that includes direct and indirect relationships, or from among the plurality of data in addition to direct correlations among the plurality of data. An associative memory may also take the form of software. Thus, an associative memory also may be considered a process by which information is collected into associated groups in the interest of gaining new insight based on relationships rather than direct correlation.

As used herein, the term "entity" refers to an object that has a distinct, separate existence, though such existence need not be a material existence. Thus, abstractions and legal constructs may be regarded as entities. As used herein, an entity need not be animate.

FIG. 1 illustrates one use of a kinematic detection system, in accordance with an illustrative embodiment. The use of a kinematic detection system shown in FIG. 1 does not necessarily limit the claimed inventions, but rather only shows one possible use of the illustrative embodiments. Additional uses for the illustrative embodiments are described below.

Nevertheless, the exemplary use illustrated in FIG. 1 includes using data collected from motion sensing input device 100 to track movements of individual 102. The movements are fed into associative memory 104 using semantics associative memory 104 best understands. These semantics may be classified with previous recordings of desirable movements 106 and undesirable movements 108. The illustrative embodiments use this information to determine if the current movements of individual 102 are desirable or undesirable. If the individual's movements are not desirable, such as indicated by symbol 110, then the illustrative embodiments may generate alert 112 to remind individual 102 that his or her current movements may be undesirable.

More generally, motion sensing input device 100 may be any apparatus used to detect changes in position of an object relative to its surroundings or the change in the surroundings relative to an object. In a specific example, which does not necessarily limit the claims, motion sensing input device 100 may be a product that is commercially available off the shelf. Motion sensing input device 100 may be normally used for playing video games, such as in FIG. 3 for example. However, motion sensing input device 100 may be an accelerometer, a camera system, or any other suitable technology for detecting the movement of one or more persons or objects in an area. Thus, for example, motion sensing input device 100 may be used to track positions of a robot. In this case, the illustrative embodiments may determine whether movements of the robot are within design parameters.

Additionally, the illustrative embodiments are not necessarily limited to determination of whether a movement or a set of movements are considered desirable or undesirable. Any classification system may be used, as described further below.

Generally, classification is the task of identifying to which one of a set of categories a new observation belongs. This identification or determination may be made on the basis of a training set of data containing observations or instances whose category membership is known.

For example, without necessarily limiting the claimed inventions, the illustrative embodiments may be used to determine whether the detected movement refers to texting, talking on the phone, walking, using a handrail, or any other particular physical activity. The set of possible outcomes may be "texting, talking on the phone, walking, or using a handrail." A determination is made whether the detected movement refers to one member of this set. This determination may be made using an associative memory on the basis of a training set of data containing observations or instances whose category membership is known. In other words, the associative memory has been trained to recognize a particular set of input data as being associated with "texting". In each of these cases, the detected movement may be used to generate an alert if a particular movement is detected.

In the case of an object, the illustrative embodiments may be used to detect specific positions, orientations, and/or movements of a robot or of a vehicle, assuming that object can be recognized by an input device. Thus, the illustrative embodiments are not necessarily limited to use with a human and are not necessarily limited to any particular classification system, such as "desirable" or "undesirable". Accordingly, for any example used herein that refers to determining whether a human user's movements are considered "desirable" or "undesirable", one may automatically assume that the other uses and classification systems described above could have been used instead.

Figure 2:
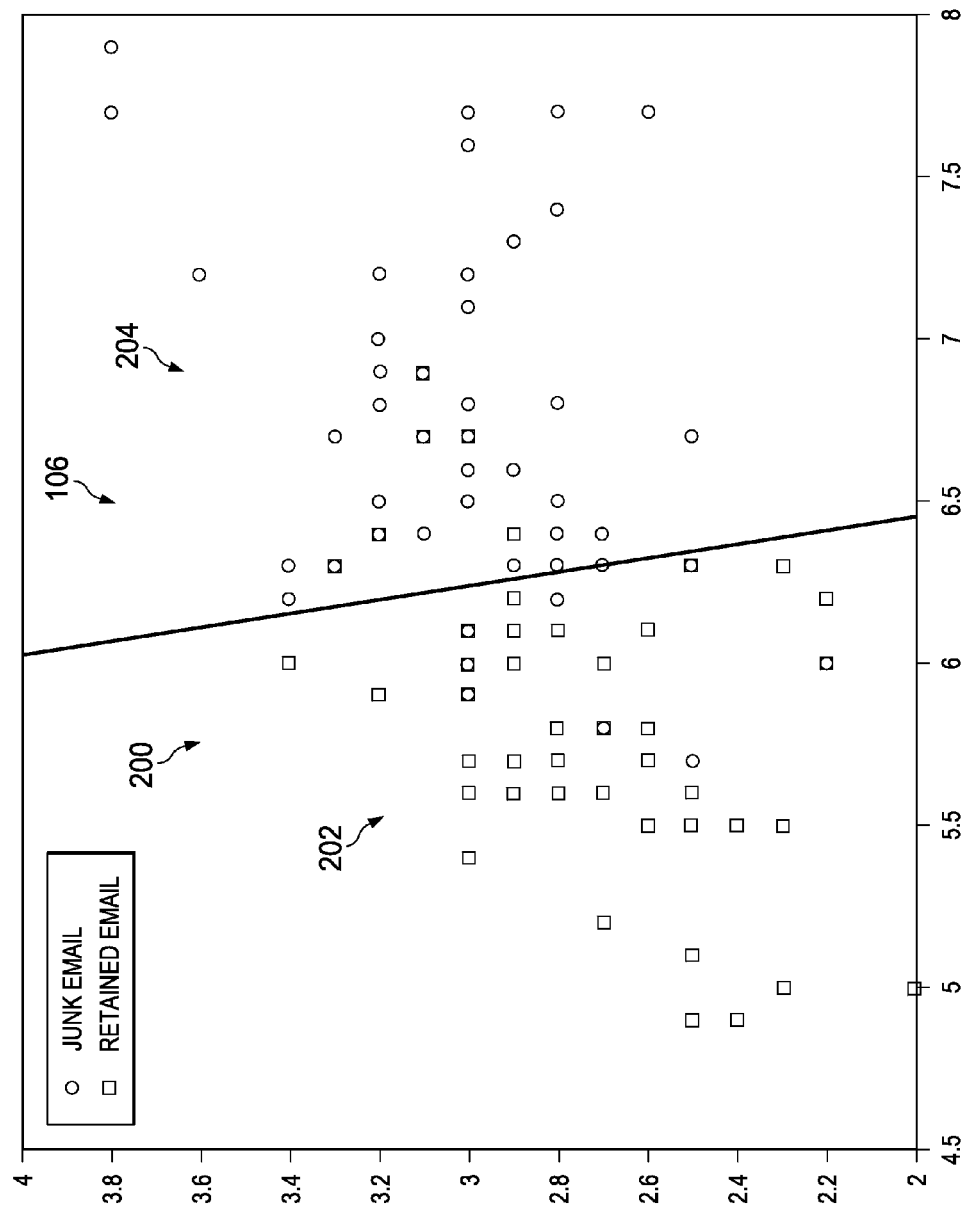
FIG. 2 illustrates an example of a classification system, in accordance with an illustrative embodiment.

FIG. 2 illustrates an example of a classification system, in accordance with an illustrative embodiment. Classification 200 of FIG. 2 illustrates the principles of classification as used herein, not necessarily the illustrative embodiments. In other words, classification 200 illustrates principles of classification that may be used for implementing the illustrative embodiments with respect to determining whether motions of a user are desirable or undesirable, as described with respect to FIG. 1.

Attention is first turned to what is meant by the term "classification". "Classification", as used herein, is defined as the ability to identify, or the act of identifying, to which group of objects a new observation belongs by comparing a new observation's characteristics to a known set of characteristics. As used in the illustrative embodiments, the known characteristics are established by training the system. "Training the system", as used herein, is defined as the ability to define, or the act of defining, for the system the characteristics of the known members of the set. When the system is trained, the system may then quickly compare a new observation's characteristics to the set of known members' characteristics, and then equate the new observation as being the one of the known members of the set which most closely matches the new observation's characteristics. As used herein, "the system" or "the illustrative embodiments" refer to a processor, an application specific integrated circuit (ASIC), and/or other physical equipment used or usable to implement the illustrative embodiments, including possibly a non-transitory computer readable storage medium storing program code for implementing the motion capture and classification system described herein.

Returning to FIG. 2, this figure illustrates an example of classification with respect to an email system. In this case, the system classifies incoming email as either retained email or junk email based on certain characteristics. Thus, classification 200 has two known members in the set of known members. These known members are retained email 202 and junk email 204. The system has been trained by establishing first characteristics of retained email 202 and second characteristics of junk email 204. The system is then programmed to compare third characteristics of a new observation, which is an incoming email, to the first characteristics of retained email 202 and the second characteristics of junk email 204. The new observation is then classified as either belonging to retained email 202 or junk email 204.

Again, the characteristics that make up each category, retained email 202 or junk email 204, are already known. For example, retained email 202 typically comes from a recognized sender. Thus, retained email 202 has, as one characteristic, a recognized sender. Other characteristics are also possible. Conversely, junk email 204 typically has a characteristic that it does not come from a recognized sender. Junk email 204 often also has other characteristics, such as the presence of words used in solicitation to sell a product or service. Depending on the number of common matches between characteristics of the new observation and characteristics of the known set of members, the system will establish the appropriate category to place the incoming email.

In the terminology of machine learning, a classification system is considered an instance of supervised learning; that is, learning where a training set of correctly-identified observations is available. The corresponding unsupervised procedure is known as clustering or cluster analysis. Cluster analysis may involve grouping data into categories based on some measure of inherent similarity. An example of measures includes the distance between instances, considered as vectors in a multi-dimensional vector space.

Figure 3:
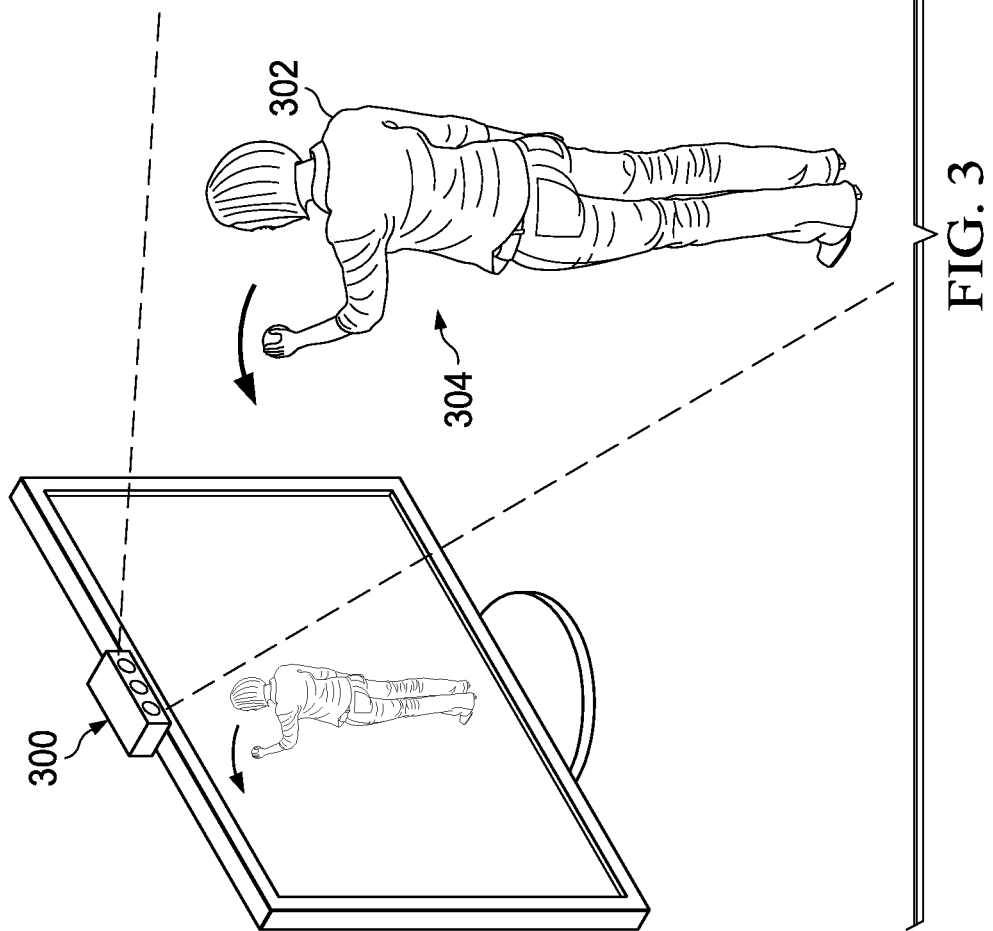
FIG. 3 illustrates an example of a kinematic detection system in use, in accordance with an illustrative embodiment.

FIG. 3 is an example of a kinematic detection system in use, in accordance with an illustrative embodiment. Kinematic detection system 300 may be motion sensing input device 100 of FIG. 1. The movements of user 302 may be classified by the system using a classification system, in a manner analogous to that shown by classification 200 of FIG. 2.

As described above, the illustrative embodiments may use kinematic detection system 300 to movements of user 302. Motion sensing input devices, such as motion sensing input device 100 of FIG. 1, may be used as part of kinematic detection system 300 to detect a change in position of user 302 relative to his or her surroundings 304.

Typically, motion sensing input devices such as kinematic detection system 300 include software which displays the Cartesian coordinates of where the detected movement took place. This display could take the form of a stick person, such as stick person 306, or may not be visually represented at all. In either case, the illustrative embodiments may use the measured coordinates to calculate the movements of user 302.

In order to gauge the subject's movements, the illustrative embodiments may correlate the coordinates of a position shared by all parties, that is to say the illustrative embodiments may compare hand movements to hand movements. The measurements can be further normalized if desired. For example, the illustrative embodiments could also use the distance between parts of the body which are relatively static, such as the center hip to the spine, in normalizing the the measurements.

Figure 4:
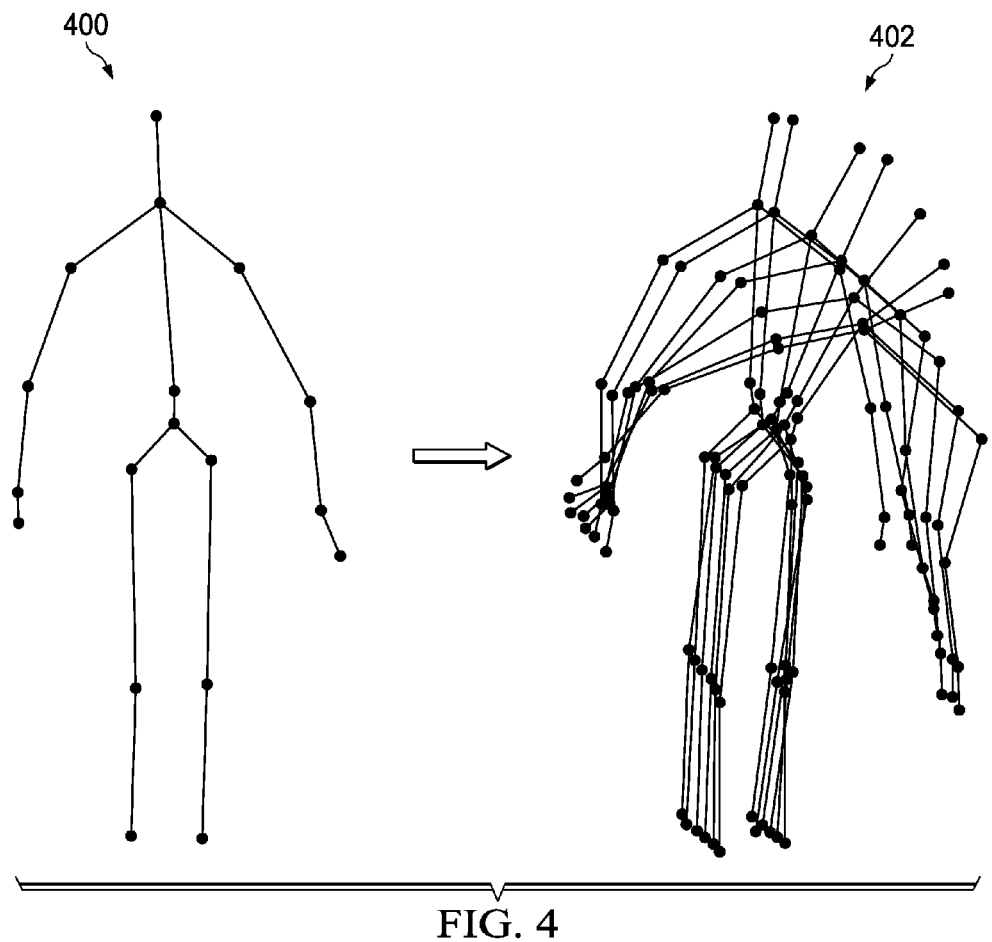
FIG. 4 illustrates an example of a snapshot used to represent an entire movement, in accordance with an illustrative embodiment.

FIG. 4 illustrates an example of a snapshot used to represent an entire movement, in accordance with an illustrative embodiment. Each of single snapshot 400 and snapshots 402 may be examples of stick person 306 of FIG. 3. Single snapshot 400 and each of the snapshots constituting snapshots 402 all represent detected movements of a human user, such as individual 102 of FIG. 1 or user 302 of FIG. 3.

FIG. 4 illustrates single snapshot 400 may indicate a movement of a human user, though again the illustrative embodiments are not limited to human users. Thus, snapshots 402 may describe an entire movement of a human user, whereas single snapshot 400 indicates a position of the user at a point in time.

The illustrative embodiments assume that the movement drawings, such as snapshots 402, describe an entire movement of a user, even though they appear to be that of a single instance or single snapshot 400. In other words, the illustrative embodiments typically do not operate with a single snapshot, such as single snapshot 400, but rather with snapshots 402.

Typical examples of the illustrative embodiments operate under a number of assumptions. In some cases, these assumptions may be varied.

For example, the illustrative embodiments typically rely on a novel application of a motion sensing input device coupled with an associative memory, rather than the core technologies that one uses to accomplish these processes. However, in some cases, the illustrative embodiments may use modified or enhanced versions of these core technologies, motion sensing input devices, and associative memories.

The illustrative embodiments typically include the ability to classify an observation using an example of an associative memory classification. However, the illustrative embodiments could be accomplished with any sort of classification mechanism and are not limited to only the use of an associative memory.

The illustrative embodiments typically use human body joints as points of articulation. However, any position or spot on the body could be used, as long as these positions or spots correspond to a movement. In the case of robots or vehicles, or for tracking the position of other articulating objects, any points of articulation could be used. More generally, any points on any object could be used for tracking movements, though points of articulation are often more convenient.

The illustrative embodiments include the ability to detect movements by using an interface to a motion sensing input device. This interface can vary in scope and functionality, but preserves the job of defining the coordinates of a movement in whatever capacity the motion sensing input device can handle. In most cases the illustrative embodiments need not make any attempt to define when a movement starts or ends.

The illustrative embodiments typically do not define the placement or location of the motion sensing input device with regards to the quality of the movement captured. The illustrative embodiments assume proper operation of such devices.

The illustrative embodiments are generally not limited to identifying only one desirable movement and one undesirable movement. Instead, many different types of movements could be analyzed and classified. Additionally, the illustrative embodiments may be used in many different applications, other than applications for determining whether a motion of a user or object is desirable or undesirable. For example, the illustrative embodiments may be used in the field of security to determine whether movement of some object violates a set of pre-defined parameters or moves past a certain distance. The illustrative embodiments may be used in manufacturing to determine whether movement of objects along an assembly line are within defined parameters. The illustrative embodiments have many other applications. The illustrative embodiments may be used in the medical arts, such as to assist a patient in physical therapy to perform desirable movements more consistently.

The illustrative embodiments do not necessarily limit how a movement is recorded. In other words, the illustrative embodiments may work with many different data structures. The illustrative embodiments may capture a sequence of changes and save them in any convenient manner, perhaps within a database, in memory, within a file, or any convenient data structure.

Figure 5:
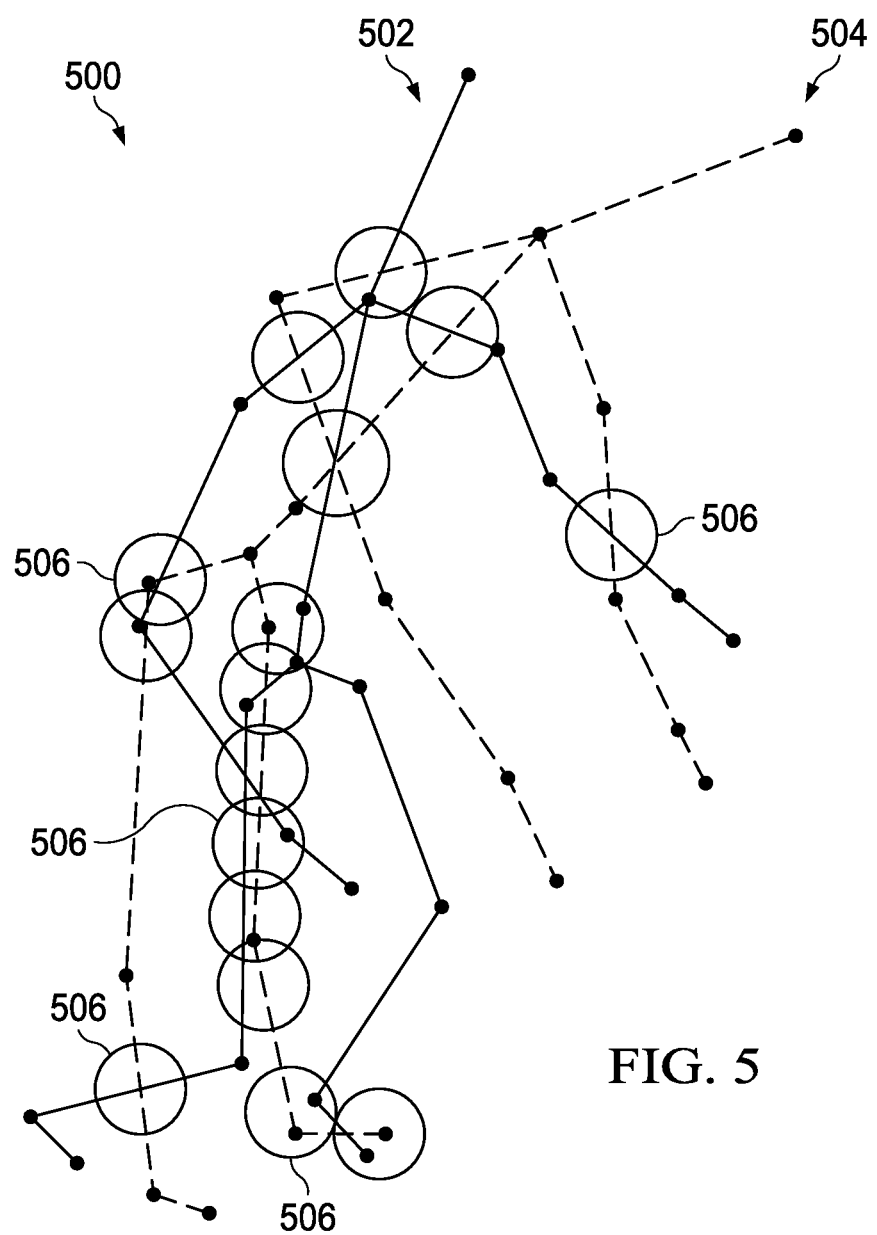
FIG. 5 illustrates an example of common coordinates in the context of multiple movements, in accordance with an illustrative embodiment.

FIG. 5 illustrates an example of common coordinates in the context of multiple movements, in accordance with an illustrative embodiment. Set of movements 500 may be snapshots 402 of FIG. 4.

FIG. 5 illustrates two different movements of a user, movement 502 and movement 504. Movement 502 may be considered "desirable". Movement 504 may be considered "undesirable". As seen in FIG. 5, when the two movements are super imposed on top of each other, there are many common points 506 between them, even though each movement itself represents a different outcome or desirability. As a result, using only coordinates to classify movements like these may be unwanted in some illustrative embodiments.

Again, one exemplary use of the illustrative embodiments is to determine if an identified movement is desirable or not, using a motion sensing input device coupled with an associative memory. To accomplish this goal, the illustrative embodiments feed data, collected from a motion sensing input device, into an associative memory. Before processing the data, the illustrative embodiments transform the data into a vernacular the memory best understands. In other words, the illustrative embodiments transform quantitative measurements into qualitative descriptions.

Then, the associative memory classifies the new movement by using a collection of previously recorded desirable and undesirable movements. The previously recorded movements represent truth data used to "train" the system. When a new observation is introduced, the system uses the characteristics of the training or truth data to determine if the new observation is desirable or not. The illustrative embodiments would operate in a similar manner when using other classification systems or for other applications.

In order for an associative memory classification to work most efficiently, the information gathered from the recording process should be as complete and accurate as reasonably possible. A classification scheme will be more useful if relevant data is compared; otherwise, the results produced may not be trustworthy. As a result, collecting only the coordinates themselves is often not sufficient because many of the coordinates could be frequently represented in multiple sets of movements, as shown by common points 506.

Figure 6:
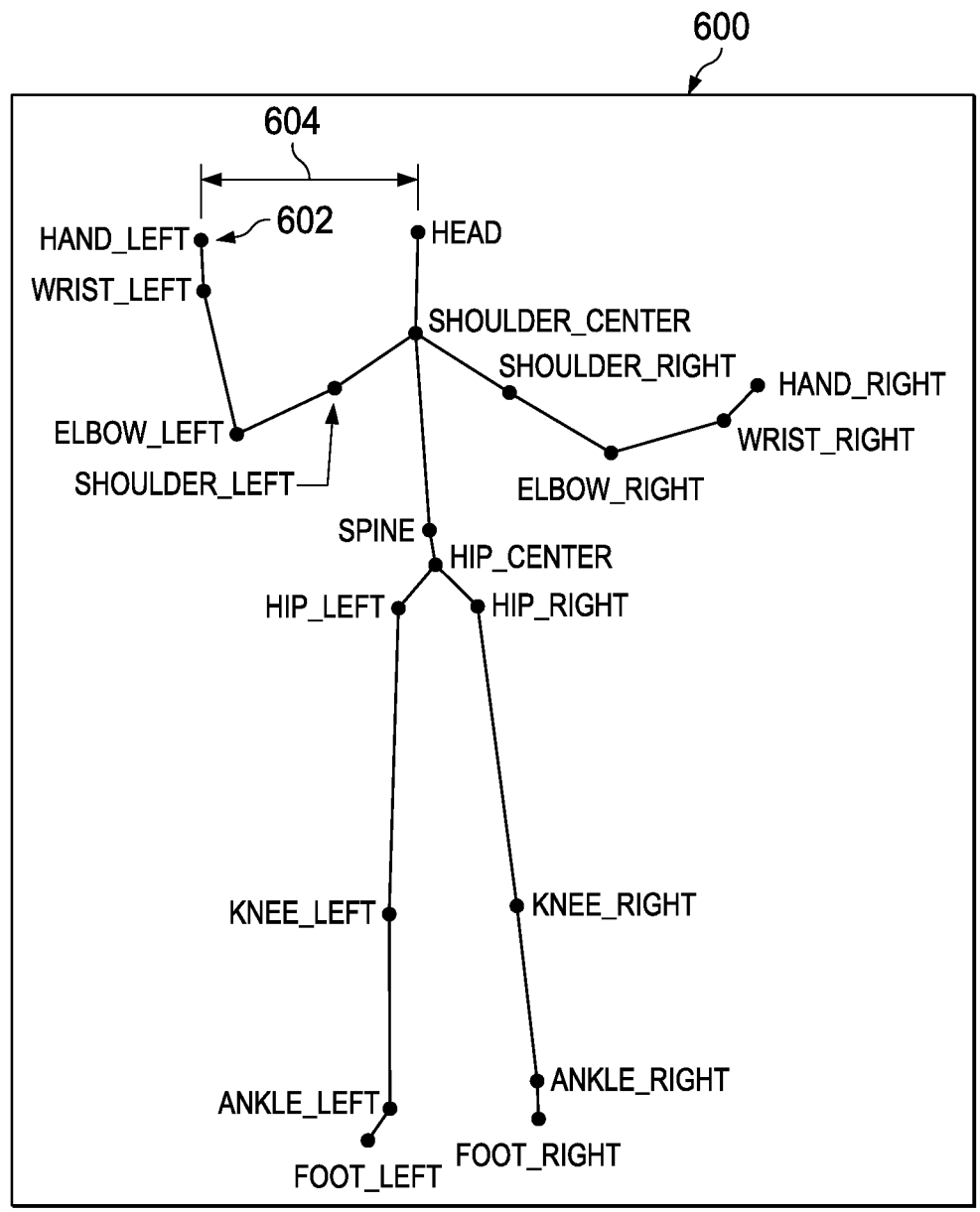
FIG. 6 illustrates an example of identifying points of articulation using a qualitative naming system, in accordance with an illustrative embodiment.

FIG. 6 illustrates an example of identifying points of articulation using a qualitative naming system, in accordance with an illustrative embodiment. Snapshot 600 may be stick person 306 of FIG. 3 or either one of movement 502 or movement 504 of FIG. 5.

FIG. 6 shows the coordinate points of on a user's body that are being tracked. The qualitative terms shown in FIG. 6 describe, in qualitative terms, the relationship of a given point to other points. In some cases, the points themselves may have qualitative names associated with them. The system may quantitatively measure the locations and/or relative positions of points using a kinematic measurement device, though the system will translate these quantitative measurements into qualitative terms for use with an associative memory. Thus, for example, point 602 is labeled as "Hand_Left", indicating both the point and the relationship of the "hand" to, for example, the hip, the head, or other centerline of the body.

Thus, the illustrative embodiments may be used to collect information calculated from tracked coordinates and transform this information into semantics that best exploit the benefits of an associative memory. For example, the distance from one joint to another could be interpreted as near, nearer, nearest, or far, further, furthest. These terms could then be manipulated by the associative memory to produce better classifications. The lists below, not withstanding, provides some designations on how coordinates could be transformed into associative memory semantics.

For use in an associative memory, use of qualitative descriptors may be more useful when comparing to known or training positions. Thus, from the coordinates collected, the illustrative embodiments may calculate quantitative distances defined as the length between one joint to another. Qualitatively described, ranges of measurements may be assigned qualitative descriptors, such as FAR, FARTHER, FARTHEST or NEAR, NEARER, NEAREST. For example, the distance from the right wrist to the left shoulder, could be described as FARTHER when the quantitative distance measurements are within one particular range, but described as NEAREST within another range.

Likewise, relative locations may also be qualitatively expressed based on quantitative measurements. For example, comparing the coordinates collected with the dimensions of the screen, the illustrative embodiments could determine a general location for a body part, such as TOP, MIDDLE, BOTTOM combined with RIGHT, CENTER, LEFT. In a more specific example, the right foot may be located in the lower right section of the screen, so it could be labeled as BOTTOM_RIGHT. In the case of dynamic movements, the location could be excluded, allowing the embodiment to more easily classify moving objects.

Similarly, directions may also be assigned qualitative descriptors based on quantitative measurements. For example, from the coordinates collected, the illustrative embodiments could also determine a direction of one joint to another, such as NORTH, SOUTH, WEST or EAST. In a more specific example, the head may be located NORTH_WEST of the right foot.

Additional or different terminologies could be used as well, such as degrees or angles. Furthermore, terms could be grouped together to create a single attribute or a combination of attributes. For example, the qualitative descriptor "TOP_LEFT_NEAREST_NORTH_FAR_EAST" could be used as a single attribute to describe the relationship between the left hand and the head, as indicated by arrows 604.

For the purpose of movements, the use of more reference points may improve the outcome of the illustrative embodiments. For example, when evaluating a movement, one could use the twenty joints for a person, as outlined in FIG. 6. However, more or fewer reference points could be used in other illustrative embodiments.

The illustrative embodiments also recognize that in some cases excluding certain joints, points of articulation or measurement points may be desirable. For example, some measurement points might not add value to a classification system. For example, a movement could occur at a desk where the lower extremities are not visible or not of interest, and as a result, those joints need not be processed.

The overall process of capturing a movement and deciding if the movement is desirable or undesirable involves a few logical steps described further below. For the purpose of clarity, each step is described in the context of using the example of picking up an object, wherein bending with one's back is considered undesirable but bending with one's knees is considered desirable. However, the illustrative embodiments should not be limited to this specific example, but instead, the illustrative embodiments contemplate many different classification schemes and movement types.

Figure 7:
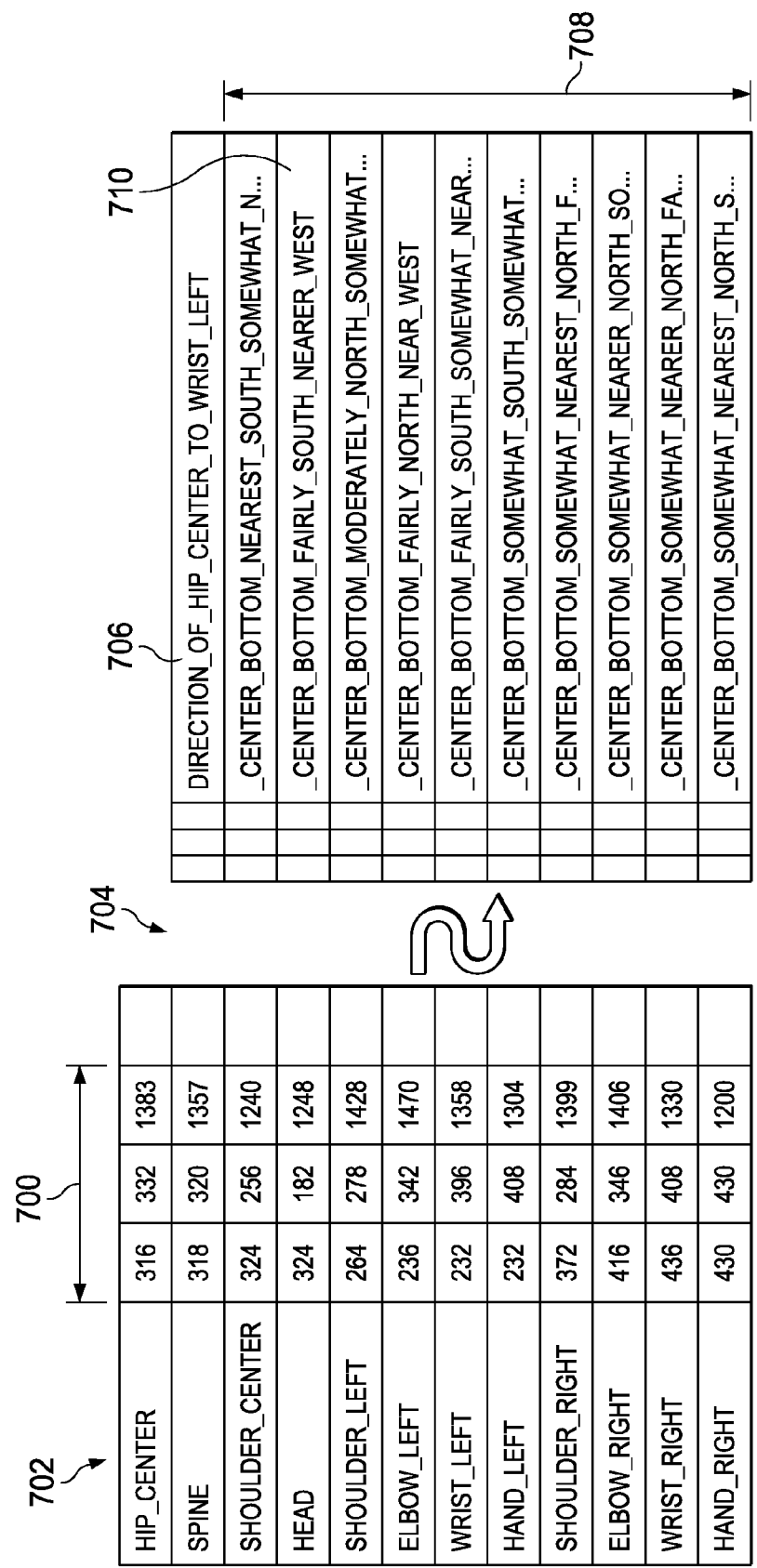
FIG. 7 illustrates an example of data transformation from quantitative measurements to qualitative names, in accordance with an illustrative embodiment.

FIG. 7 illustrates an example of data transformation from quantitative measurements to qualitative names, in accordance with an illustrative embodiment. The quantitative data may have been taken from a motion sensing input device, such as motion sensing input device 100 of FIG. 1 or kinematic detection system 300 of FIG. 3.

However, prior to data capture, the illustrative embodiments contemplate training the associative memory in a particular classification system. In other words, a first step to the illustrative embodiments may be to train the associative memory in a particular classification system by use of a motion sensing input device to capture a series of movements that a person designates as desirable and another series of movements that a person designates as undesirable. During the training session, a user could record several example movements and label them as desirable or not, depending on what was observed. These exemplary movements may be referred-to as trained movements.

Thereafter, the user performs a new movement, or perhaps performs several new movements. The new movement is an "unknown" movement that will be compared to the trained movements, as described below.

The new movement is quantitatively measured using a kinematic input device. In other words, the kinematic input device outputs quantitative data, or series of mathematic, measured coordinates of the points of articulation. This quantitative data, which is the coordinates of the points of articulation that are being measured, is saved in a data structure.

For example, the numbers in columns 700 represent quantitative data, measured by a kinematic input device, of movements of points of articulation on a person. The points of articulation are listed in column 702. Thus, for example, range of quantitative measurements "316, 332, 1383" in the first row of columns 700 relate to quantitative measurements of the movement of the hips of a person. In this case, the point of articulation is assigned the descriptor "HIP_CENTER", as shown in the first row of column 702. This information is provided by the motion sensor and collected locally within a data structure of some type, perhaps within a database, on a file or in memory.

In FIG. 7, divider 704 is provided to indicate a translation from the quantitative measurements to the qualitative descriptions. Note that there is not a direct correspondence between the rows shown to the left of divider 704 and the rows shown to the right of divider 704.

As mentioned above, for each point of articulation, the quantitative data is translated into a qualitative description. Additionally or alternatively, the qualitative description may have a label that represents a relationship between one point of articulation and another point of articulation with respect to a movement. This label may be assigned to a category that represents a type of relationship between one point of articulation and another.

Continuing the above example, category 706 may be "DIRECTION_OF_HIP_CENTER_TO_WRIST_LEFT". Category 706 contains information describing a relationship between two points of articulation, the "HIP_CENTER" and the "WRIST_LEFT", and specifically describing (in qualitative terms) a series of positions of the left wrist relative to another series of positions of the hip. Both of the points of articulation used in this example ("HIP_CENTER" and "WRIST_LEFT") are shown in column 702 and the corresponding quantitative measurements for these points of articulation are shown in columns 700. However, these quantitative measurements have been translated into qualitative descriptions, as indicated by the arrow in divider 704.

In any case, qualitative descriptions 708 are provided within a category 706. Again, these qualitative descriptions 708 each have a corresponding label that indicates a specific relationship, for example, between the center of the hip and the left wrist during a movement. For example, label 710 represents at least part of a movement in which the direction of the center of the hip to the left wrist is "CENTER_BOTTOM_FAIRLY_SOUTH_NEARER_WEST". This label 710 represents a qualitative description of the position of the left wrist relative to the hip.

A purpose of FIG. 7 is to illustrate translation of numerically measured coordinates into qualitative terms. Thus, FIG. 7 only shows a limited set of points of articulation, numbers, categories of relationships, and labels. Many more, or possibly fewer, of each may be present in an actual application, or read into the claims. Different kinds of relationships and points of articulation may also be present, and possibly some or all of these points of articulation, numbers, categories of relationships, and labels may be absent. Thus, FIG. 7 does not necessarily limit the claimed inventions, but rather is a representative example to demonstrate one mode of operation of the illustrative embodiments.

With this caveat in mind, the verbiage of the qualitative descriptions used to describe the measurements should provide enough distinct information to make a classification as accurately as desired, even though the associative memory will be comparing the values associated to the qualitative labels to each other. However, regardless of the number, type, and form of qualitative descriptions and labels used, these qualitative descriptions, their labels, and their categories are inserted or stored into an associative memory for further processing.

For example, the qualitative descriptors and categories for an unknown movement may be compared to corresponding qualitative descriptors and categories of the set of trained movements. By identifying the most number of matches in qualitative descriptors, the associative memory may classify the unknown movement. In particular, the specific trained movement that most closely matches the unknown movement (in terms of matching qualitative descriptors) is identified. The unknown movement is then categorized as being that specific trained movement. Thereafter, an alert or feedback may be generated depending on whether the user is being trained to avoid certain undesirable movements, or perhaps to imitate certain desirable movements.

Again, the list shown to the right of divider 704 provides a list of possible relationships between the user's hip to the user's left wrist based on actual coordinates provided by the motion sensor. These relationships provide qualitative terms so the associative memory may more quickly compare an unknown set of movements to a trained set of movements. In addition, using qualitative terms allows an associative memory to incorporate analytical tools such as word parsers and name lists which could prove beneficial when analyzing the movements.

FIG. 8 through FIG. 11 are provided in the context of one illustrative process for using the illustrative embodiments. This illustrative process is not necessarily limiting of the claimed inventions, and may be varied. However, in this one example, the process has five steps, some of which may be optional. The first step is to train the associative memory to use a particular classification schema. The second step is to capture an unknown movement using a motion sensing input device. The third step is to select comparison criteria for the unknown movement. This step may be considered optional. The fourth step is to identify the unknown movement using the associative memory classification schema established in the first training step. The fifth step is to notify the user of the identified movement, particularly if the movement is considered undesirable.

Figure 8:
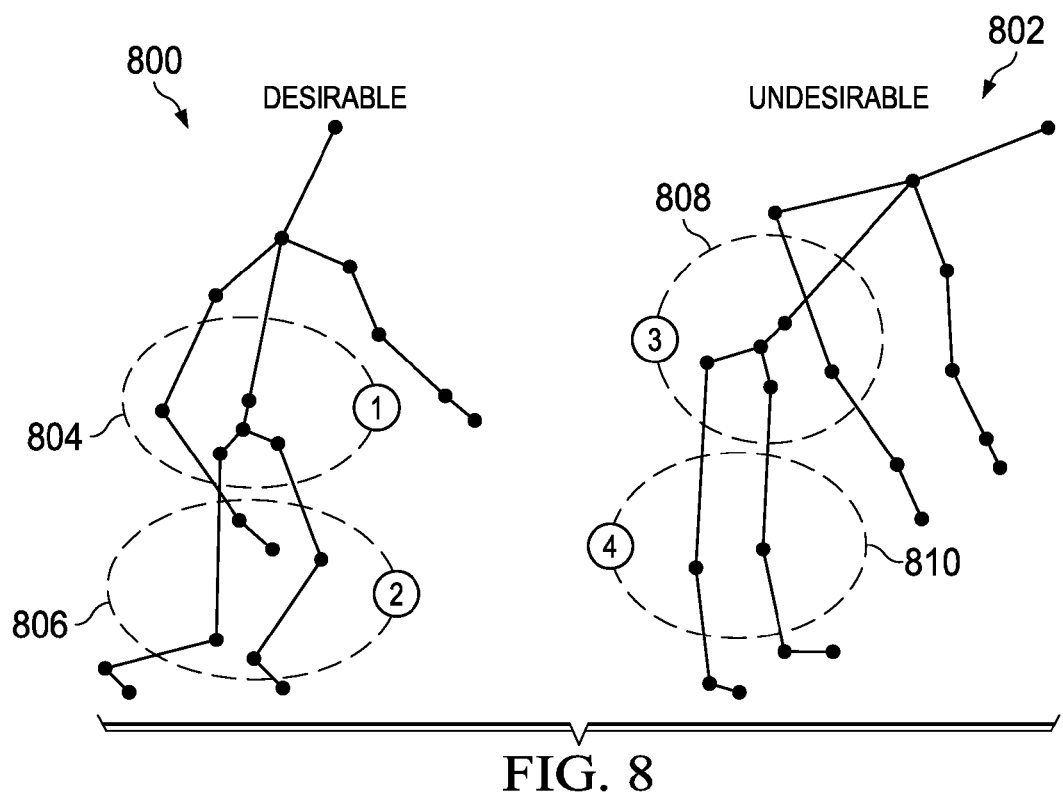
FIG. 8 illustrates an example of desirable and undesirable movements, in accordance with an illustrative embodiment.

FIG. 8 illustrates an example of desirable and undesirable movements, in accordance with an illustrative embodiment. Stick person 800 and stick person 802 may be snapshots 402 of FIG. 4, either of the stick persons shown in FIG. 5, or the stick person shown in FIG. 6. FIG. 8 is portrayed in the context of the first step of the illustrative embodiments described above, which is to train the associative memory in a particular classification schema.

FIG. 8 shows stick person 800 and stick person 802. Stick person 800 illustrates a set of movements of a user that may be considered desirable. Stick person 802 illustrates a set of movements of a user that may be considered undesirable.

For the "bending" example described above, the user could make a set of two kinds of recordings. One set of movements may relate to an undesirable movement, such as picking up an object while bending with their back. The other set of movements may relate to a desirable movement, such as bending with the knees when picking up the object. Each movement would be labeled as such, either desirable or undesirable, in this classification schema. Again, the illustrative embodiments are not limited to this example or classification schema.

As demonstrated in FIG. 8, a desirable movement might contain a somewhat straight back, as shown by the set of articulation points in circle 1 804, with bent knees, as shown by set of articulation points 2 806. In contrast, an undesirable movement might contain a bent back, as shown by set of articulation points in circle 3 808, with straight knees, as shown by set of articulation points 4 in circle 810. Again, the user trains the associative memory to recognize these particular movements or postures as being desirable or undesirable. Once the training movements are captured, they are ingested into an associative memory to form the foundation of a classification schema.

Figure 9:
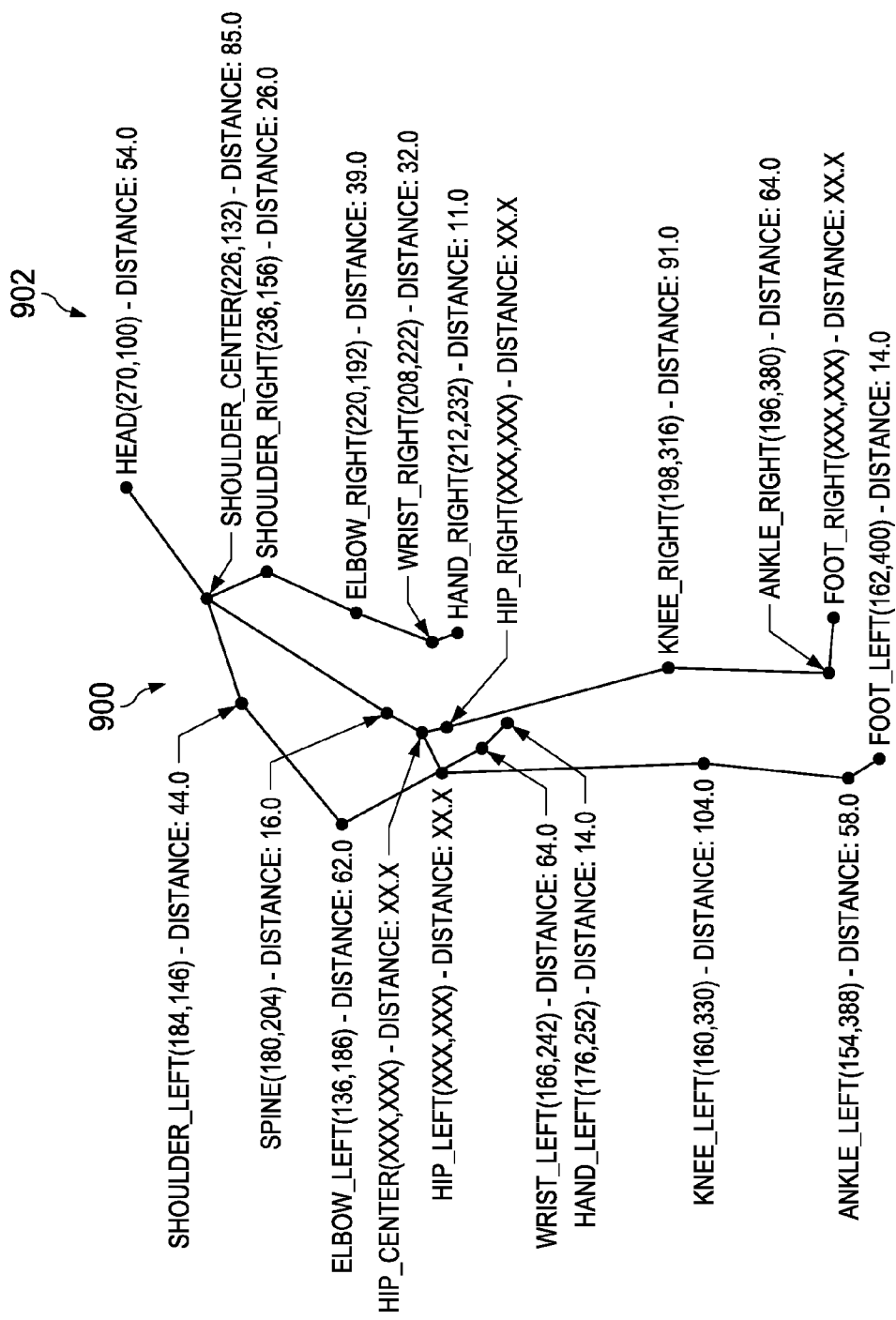
FIG. 9 illustrates an example of an unknown movement, in accordance with an illustrative embodiment.

FIG. 9 illustrates an example of an unknown movement, in accordance with an illustrative embodiment. Stick person 900 may be stick person 800 or stick person 802 of FIG. 8, may be snapshots 402 of FIG. 4, may be either of the stick persons shown in FIG. 5, or may be the stick person shown in FIG. 6. FIG. 9 is portrayed in the context of the second step of the illustrative embodiments described above, which is to receive an unknown set of movements from a motion sensing input device or kinematic detection system, such as described in FIG. 1 or FIG. 3.

Again, a second step in an illustrative process may be to capture an unknown movement in order to later classify that unknown movement. The unknown movement is recorded in the same fashion as the training movements, except the unknown movement is not labeled or labeled as "unknown". FIG. 9 shows that each point of articulation or point is associated with a qualitative descriptor for a name and then a numerical measurement of the position or set of positions for that point, as shown by the text in the area of arrow 902. The purpose of this illustration is to demonstrate what kind of information could be initially captured by a motion sensing device. However, the illustrative embodiments may only need the labels and their corresponding coordinates to operate.

Figures 10, 11:
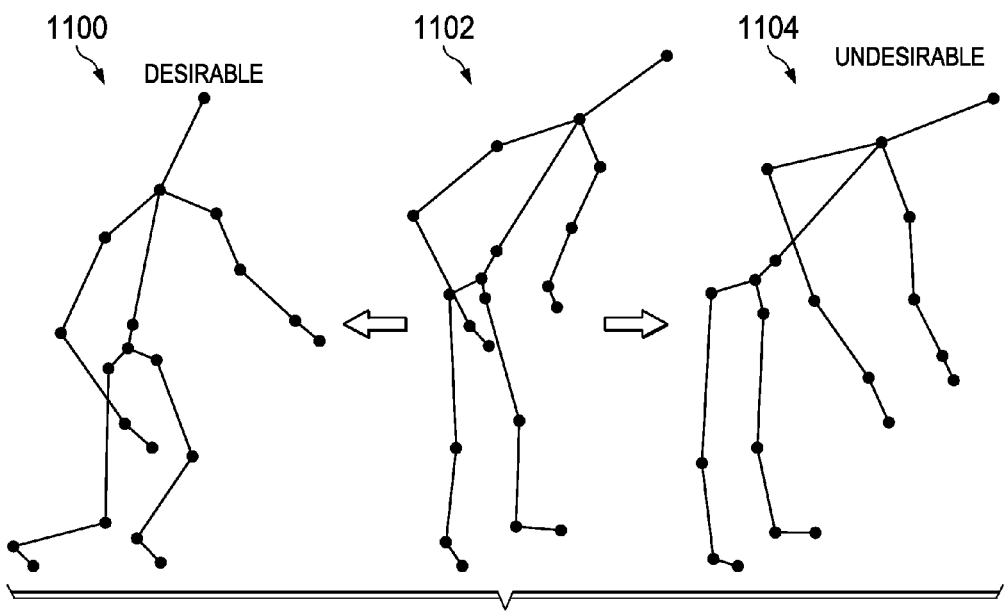
FIG. 10 illustrates an example of comparison criteria for a movement, in accordance with an illustrative embodiment.
FIG. 11 illustrates an example of identifying an unknown movement, in accordance with an illustrative embodiment.

FIG. 10 illustrates an example of comparison criteria for a movement, in accordance with an illustrative embodiment. Criteria 1000 may be used in the context of Step 3 of the illustrative process described above, which is to select comparison criteria for the unknown movement. Step 1 of this illustrative process was described in FIG. 8 and Step 2 of this illustrative process was described in FIG. 9. Criteria 1000 may be established before, during, or after receipt of the measurements of the unknown movement.

In some, but not all, cases, criteria may be used to help the classification system make better comparisons. Thus, the illustrative embodiments provide the user the ability to influence the determination or outcome made by the associative memory through the use of comparison criteria, such as criteria 1000. Criteria 1000 may be used to inform the system which attribute categories to use when making a comparison, or to weight certain attribute categories more than others. For example, the comparison criteria of the illustrative embodiments may be used to reduce the importance of the attribute "distance from the head to the left shoulder" when making its determination. The system can generate criteria 1000 itself, and further can provide the relative weighting itself, but input from the user could provide better results.

For the purpose of identifying movements, the illustrative embodiments may incorporate criteria which focus on, but are not limited to, distances, locations and directions of each joint. For distances and directions, each criterion represents a connection between two joints. Examples include the distance from the left hand to the right hand, or the direction of the left shoulder with respect to the right elbow. Consequently, capture of the value of the reciprocal movement or of the movement unto itself may not be necessary.

In any case, a user may assigns weights 1002 to each category. These weights may indicate a relative importance, from low to high, of a particular category when comparing the unknown movement to the training movements. Selecting a weight may strengthen a particularly category's association with other attributes, thereby giving that category more or less importance.

Each weight may correspond to a level of importance represented as a range of checkboxes, though other means for accepting input may be provided and different kinds of input may be provided. A user could weigh lesser categories towards the lower end or not weigh them at all. Conversely, a user could weigh important or relevant categories towards the higher end. A weight that is not selected may be assigned a default weight of "medium", but could be assigned any default weight.

The illustrative embodiments may also supply a range for numeric categories. The range permits the corresponding category value to match within a certain percentage, allowing for more associations.

If the user chooses not to input any comparison criteria, the system may automatically select comparison criteria for them. Using an associative memory internal algorithm, the associative memory may select what it determines are the best criteria based on information gathered from the data.

In the alternative, the entire process of assigning criteria may be skipped. Thus, Step 3 of the illustrative process may be considered optional.

FIG. 11 illustrates an example of identifying an unknown movement, in accordance with an illustrative embodiment. Any of stick person 1100, stick person 1102, or stick person 1104 may be stick person 900 of FIG. 9, may be stick person 800 or stick person 802 of FIG. 8, may be snapshots 402 of FIG. 4, may be either of the stick persons shown in FIG. 5, or may be the stick person shown in FIG. 6. FIG. 11 is portrayed in the context of the fourth and fifth steps of the illustrative embodiments described above, which are to identify the unknown movement using an associative memory classification schema established during the training of the associative memory in Step 1, and then to alert the user.

The purpose of this step is to label the unknown movement as either desirable or not. The associative memory classifies the unknown movement by matching the unknown movement's characteristics with those of the known characteristics previously recorded during the training conducted in Step 1. As a result, the system will choose the qualitative descriptor, or label, from the available set of movements that most closely matches the unknown movement.

For the "bending" example described above, the unknown movement in Step 2 identifies most with that of an undesirable movement, as illustrated by stick person 1104 in FIG. 11. This determination is made from the characteristics of each movement.

However, in a real situation, a movement of the user may be difficult to classify because of sporadic movements, or because the movement does not closely resemble either the desirable or undesirable movement. Nevertheless, as shown in FIG. 11, the unknown movement may resemble the undesirable movement more than it does the desirable movement. Specifically, the unknown movement represented by stick person 1102 more closely represents the undesirable movement of stick person 1104 than the desirable movement of stick person 1100. Accordingly, the illustrative embodiments classify the movement of stick person 1102 as "undesirable", based on the characteristics of the movements.

Again, each stick person shown in FIG. 11 represents entire movements and not just a single instance or snapshot. The illustrative embodiments may be less concerned about specific body poses in points in time, and more concerned with relative movements.

After identification and verification of the unknown movement, the unknown movement can be fed back into the associative memory as a known observation. This process provides the associative memory a feedback mechanism to improve the training set. This feedback process may be considered an additional optional step in the above process.

After identification of the unknown movement, the fifth and final step is to alert the user. The user may be alerted via auditory or visual stimuli, or both, or through the use of other stimuli. In any case, the user may be alerted if the movement is undesirable. The user may also be alerted if the movement is desirable. In this manner, the user may be able to learn new habits. The user may be alerted using any desirable stimulus or stimuli, including visual, auditory, mild thermal, mild electrical, mild vibrational, and other forms of stimuli.

Figure 12:
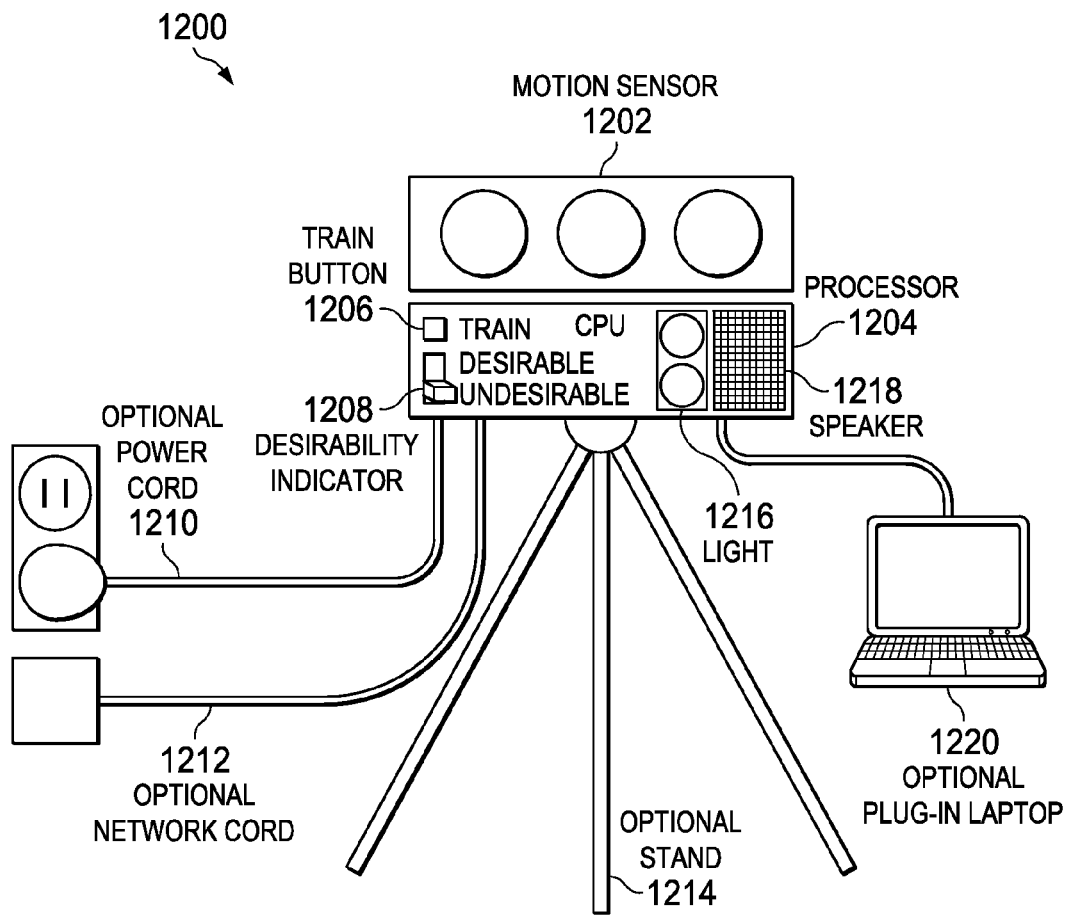
FIG. 12 illustrates an example of a kinematic detection system using an associative memory, in accordance with an illustrative embodiment.

FIG. 12 illustrates an example of a kinematic detection system using an associative memory, in accordance with an illustrative embodiment. Kinematic detection system 1200 may be, for example, motion sensing input device 100 of FIG. 1 or kinematic detection system 300 of FIG. 3. Kinematic detection system 1200 may be used to implement the exemplary method described with respect to FIG. 8 through FIG. 11. Kinematic detection system 1200 may also be used to implement process 1500 of FIG. 15, system 1600 of FIG. 16, or system 1700 of FIG. 17. The computer or processors used in kinematic detection system 1200 may be implemented using data processing system 1800 of FIG. 18.

One possible physical embodiment of the illustrative embodiments is illustrated in FIG. 12, though other physical embodiments are possible. As shown, kinematic detection system 1200 uses motion sensor 1202 connected to processor 1204 that executes the software used to implement the illustrative embodiments. The computer containing processor 1204 may include training button 1206 used to activate the training mode. The computer may also include switch 1208 used to indicate if the movement being recorded is going to be desirable or not.

Kinematic detection system 1200 could include power cord 1210 or a battery. Kinematic detection system 1200 could also include network cord 1212 or a wireless device connecting kinematic detection system 1200 to a network. In any case, kinematic detection system 1200 may communicate with an associative memory, database, or any other system used to implement the illustrative embodiments. However, in some illustrative embodiments, all the software used may be contained within processor 1204 itself. In other illustrative embodiments, the software may instead be embodied as an application specific integrated circuit (ASIC).

Kinematic detection system 1200 may include other optional devices or objects. For example, kinematic detection system 1200 may include stand 1214 or be placed somewhere motion sensor 1202 could easily observe movements. Kinematic detection system 1200 also could include light 1216 used to indicate if a movement was desirable or not. In addition, an audible sound coming from speaker 1218 could be triggered when an undesirable move is detected.

Finally, plug-in laptop 1220, tablet, mobile phone, or other computer system could be used to help configure or optimize kinematic detection system 1200. In addition, plug-in laptop 1220 could also be used to update software as desired.

FIG. 13 illustrates an example of an entity comparison, in accordance with an illustrative embodiment. Entity comparison 1300 shown in FIG. 13 is an example of an implementation of comparing an unknown movement to a set of known trained movements. This step is described above with respect to FIG. 11.

One possible implementation of the illustrative embodiments is to use a structured query language (SQL) database to record the movements and an associative memory to classify them. For this implementation, a user may set up a predefined database and insert training data as a series of transformed snapshots, and labeling the data accordingly. Along with the training data, the user could include the unknown movements as well and label them as unknown.

The data is then ingested into the associative memory. Once ingested, the user could initiate the associative memory to perform an entity comparison on the unknown movement to locate labeled movements like it. The unknown movement would adopt the label of the most closely matching movement, as shown in FIG. 13 at arrow 1302. Specifically, arrow 1302 points to label "undesirable-3", indicating a specific type of undesirable movement. The score of "1.0" indicates a high probability that the unknown movement is "undesirable-3". The common attributes between the unknown movement and the known movement labeled as "undesirable-3" are listed in the "common attributes" section of FIG. 13. However, other labels with lesser scores indicate a chance that the unknown movement has other common attributes with other labeled movements. In this case, the unknown movement has attributes in common with "undesirable-1", "undesirable-4", and "undesirable-2", sorted according to the score. The score also shows how closely the unknown movement matches the corresponding label.

Thus, the results of an entity comparison may be an ordered list of entities that are "like" or "similar to" the original or sought entity. An associative memory may collect all the matching attributes among these entities to formulate the list. The order of that list may depend on the significance of the matching attributes. Additionally, the ranking of the list may correlate to the number of attributes found. When comparing movements, the matching attributes represent verbiage describing distances, locations, and directions, all defined earlier when the unknown movement was recorded.

FIG. 14 illustrates an example of an entity comparison with an outcome as a result category, in accordance with an illustrative embodiment. Entity comparison 1400 shown in FIG. 14 is an example of an implementation of Step 4 described above, which is comparing an unknown movement to a set of known trained movements. This step is described above with respect to FIG. 11. Entity comparison 1400 is an alternative example than entity comparison 1300 of FIG. 13.

FIG. 14 shows that the illustrative embodiments can perform an entity comparison using a predefined outcome as a result category, instead of using the label, as in FIG. 13. The associative memory can be preconfigured to have each entity associate itself with a particular outcome. Thus, for example, each outcome may be labeled as unknown, desirable, or undesirable.

In this case, the illustrative embodiments can run a comparison and display the resulting outcome. This result would differ from the implementation described above with respect to FIG. 13, as there would be only two resulting attribute values: desirable or undesirable. The system would filter the "unknown" outcome in order to force the unknown movement to correlate to one of the wanted results. Accordingly, instead of seeing an entire list of attribute values, such as undesirable-3, undesirable-1, undesirable-4, undesirable-2 in FIG. 13, the user only sees outcomes of "desirable" and "undesirable".

Thus, FIG. 14 only shows two outcomes, "desirable" 1502 and "undesirable" 1504. In contrast, FIG. 13 shows four outcomes, could show many more, or could show fewer.

Figure 15:
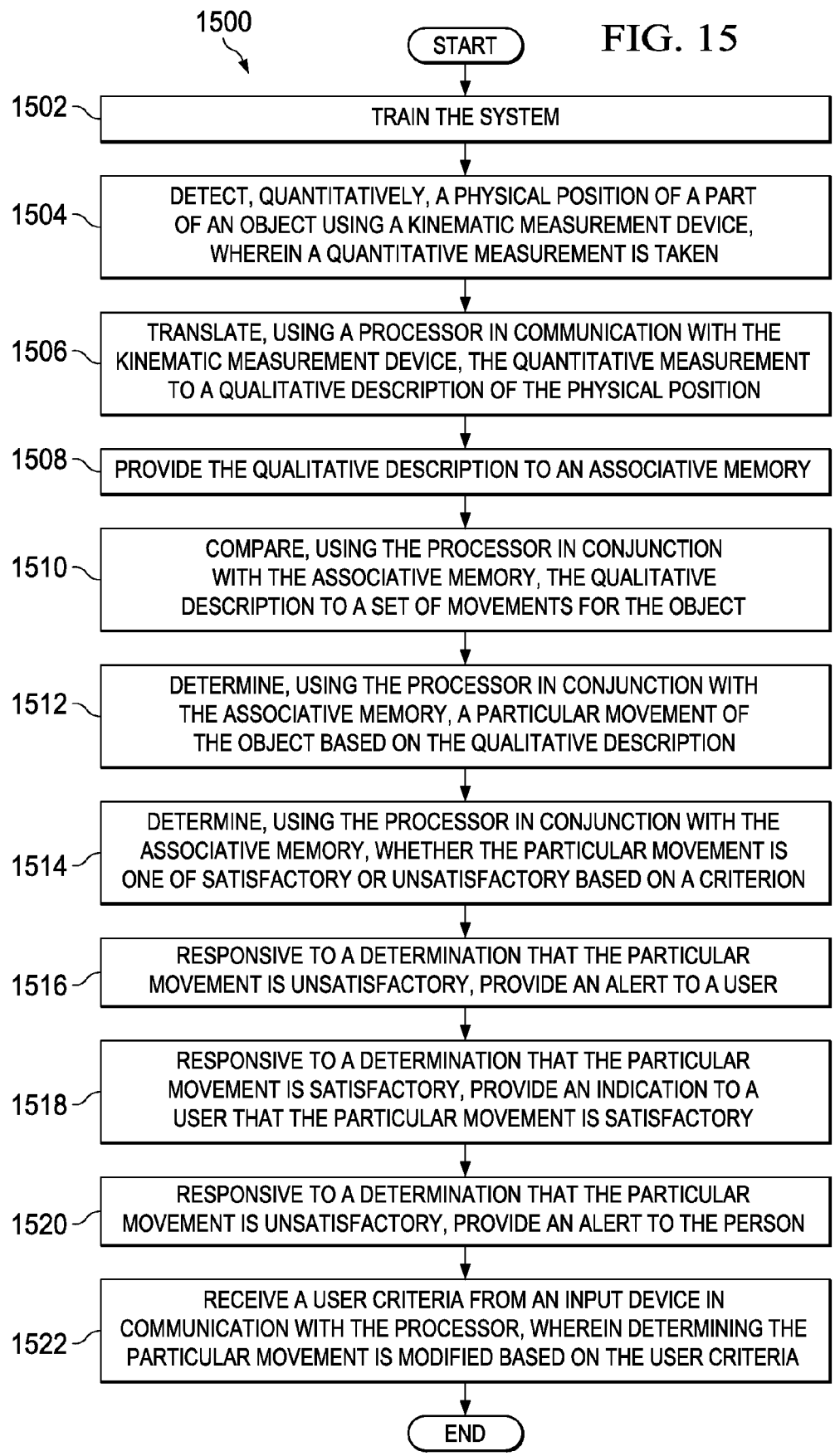
FIG. 15 is a flowchart illustrating a process for identifying a relevant differentiator, in accordance with an illustrative embodiment.

FIG. 15 is a flowchart illustrating a process for identifying a relevant differentiator, in accordance with an illustrative embodiment. Process 1500 may be implemented by system 1600 of FIG. 16, system 1700 of FIG. 17, or data processing system 1800 of FIG. 18. Process 1500 may be a flow of, or an alternative to, the techniques described with respect to FIG. 4 through FIG. 14, as well as FIG. 16 and FIG. 17. Process 1500 is specifically an example of the five step process described with respect to FIG. 8 through FIG. 11.

With respect to FIG. 15, a "process" is described as performing an action. As used herein, a "process" is considered to be a non-transitory processor or other physical device configured to perform the action described, or may be considered to be a non-transitory computer readable storage medium storing computer usable program code configured, when executed, to carry out the action described.

The process may be implemented in an associative memory comprising a plurality of data and a plurality of associations among the plurality of data. The plurality of data may be collected into associated groups. The associative memory may be configured to be queried based on at least indirect relationships among the plurality of data.

Optionally, the process may begin by training the system (operation 1502). Operation 1502 is considered optional because the system may already be trained when a user implements process 1500. If the system has not already been trained when process 1500 begins, then the first step is to train the system. Techniques for training the system are described above, such as (for example) the user demonstrating exemplary movements that are labeled as "desirable" or "undesirable", or labeled according to some other classification. The measurements taken with respect to these exemplary movements are then compared to a later, unknown movement of the user in order to classify the unknown movement as being one of the exemplary movements earlier demonstrated by the user.

Thereafter, or initially if training the system has already been conducted, the process may detect, quantitatively, a physical position of a part of an object using a kinematic measurement device, wherein a quantitative measurement is taken (operation 1504). The process may then translate, using a processor in communication with the kinematic measurement device, the quantitative measurement to a qualitative description of the physical position (operation 1506). The process may then provide the qualitative description to an associative memory (operation 1508). The associative memory may be a plurality of data and a plurality of associations among the plurality of data, wherein the plurality of data is collected into associated groups, wherein the associative memory is configured to be queried based on at least indirect relationships among the plurality of data, the associative memory embodied on a non-transitory computer readable storage medium.

Optionally, the process may compare, using the processor in conjunction with the associative memory, the qualitative description to a set of movements for the object (operation 1510). In this case the process may determine, using the processor in conjunction with the associative memory, a particular movement of the object based on the qualitative description (operation 1512).

Optionally, the process may further include determining, using the processor in conjunction with the associative memory, whether the particular movement is one of satisfactory or unsatisfactory based on a criterion (operation 1514). In another illustrative embodiment, the process may be responsive to a determination that the particular movement is unsatisfactory, provide an alert to a user (operation 1516). Alternatively, the process may, responsive a determination that the particular movement is satisfactory, provide an indication to a user that the particular movement is satisfactory (operation 1518).

In an optional illustrative embodiment, the object may be a body part of a person, wherein the movement is a movement of the body of the person. In this case, the process may, responsive to a determination that the particular movement is unsatisfactory, provide an alert to the person (operation 1520). In another illustrative embodiment, the process may receive a user criteria from an input device in communication with the processor, wherein determining the particular movement is modified based on the user criteria (operation 1522). The process may terminate thereafter.

Figure 16:
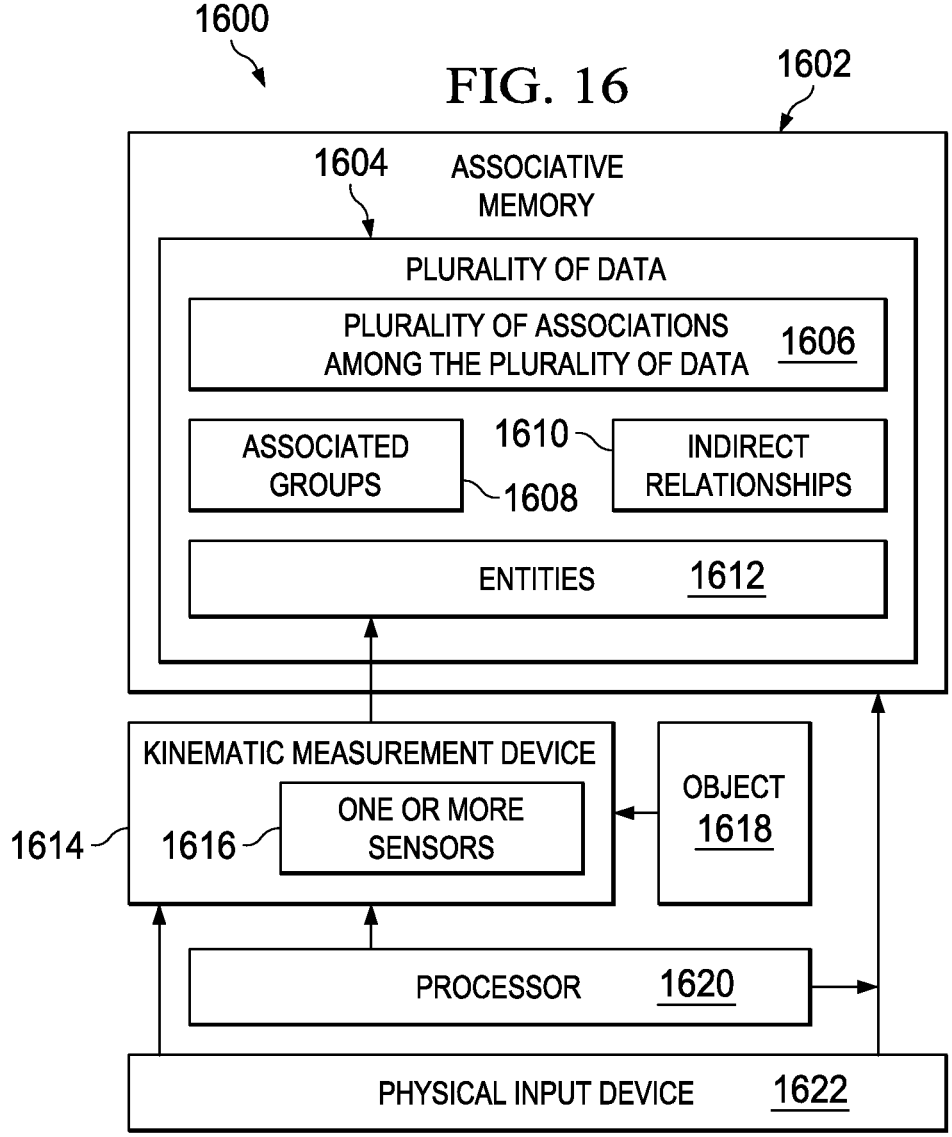
FIG. 16 is an example of a system, a kinematic measuring device, an associative memory, and a processor for converting kinematic data to qualitative names, or verbiage, in accordance with an illustrative embodiment.

FIG. 16 is an example of a system, a kinematic measuring device, an associative memory, and a processor for converting kinematic data to qualitative names or verbiage, in accordance with an illustrative embodiment. System 1600 may be an example useful for implementing the processes and techniques described with respect to FIG. 1 through FIG. 15.

System 1600 shown in FIG. 16 may be implemented using one or more data processing systems, possibly in a distributed or networked environment, and possibly by a group of remotely administered data processing systems known as the "cloud". Each of the one or more data processing systems that implement system 1600 may be data processing system 1800 described with respect to FIG. 18, or variations thereof. System 1600 may be characterized as including one or more blocks. Each of these blocks may be separate or may be part of a monolithic architecture.

System 1600 may include associative memory 1602. Associative memory 1602 may include plurality of data 1604 and plurality of associations among the plurality of data 1606. Plurality of data 1604 may be collected into associated groups 1608. Associative memory 1602 may be configured to be queried based on indirect relationships 1610 among plurality of data 1604 in addition to direct correlations among plurality of data 1604.

Associative memory 1602 may store entities 1612. Associative memory 1602 may also store relationships, both direct and indirect, among those entities 1612. Associative memory 1602 may also store individual information about each of entities 1612.

System 1600 may also include kinematic measurement device 1614. Kinematic measurement device 1614 may have one or more sensors 1616 configured to detect a plurality of physical positions of a part of object 1618. Kinematic measurement device 1614 may be in communication with associative memory 1602.

System 1600 may also include processor 1620, in communication with the associative memory and kinematic measurement device 1614. Processor 1620 may be configured to translate a range of coordinate positions of the part of the object to a qualitative description that names the range. Processor 1620 may be further configured to provide the qualitative description to associative memory 1602 for storage.

The illustrative embodiments described with respect to FIG. 16 may be varied. For example, processor 1620 in conjunction with associative memory 1602 may be configured to output an assessment of the object based on the qualitative description. In this case, assessment may be a comparison of the qualitative description to a set of pre-determined qualitative descriptions. The set of pre-determined qualitative descriptions may have corresponding qualitative descriptions of movements of the object. The output further may include a particular pre-determined qualitative description of a movement of the object that most closely matches the qualitative description. Processor 1620 further may be configured to modify the comparison based on a criteria selected by a user.

System 1600 may be modified in still further ways. For example, processor 1620 may be further configured to translate a plurality of additional ranges of corresponding sets of coordinate positions of additional parts of the object to corresponding additional qualitative descriptions that name the plurality of additional ranges. In this case, processor 1620 may be further configured to provide the corresponding additional qualitative descriptions to associative memory 1602 for storage. Additionally, processor 1620, in conjunction with associative memory 1602, may be further configured to output an assessment of the object based on a combination of the qualitative description and the corresponding additional qualitative descriptions.

In a more specific example, object 1618 may be a person, the part is a body part, and the additional parts are additional body parts. In this case, the qualitative description may be a position of the body part and the corresponding additional qualitative descriptions are other positions of the additional body parts. Likewise, the assessment may be a determination of whether a combination of the position and the other positions is one of satisfactory or unsatisfactory based on a criterion. The position and the other positions together comprise a single movement of a body of the person.

Kinematic measurement device 1614, associative memory 1602, and processor 1620 may be further configured to take additional movements of the body of the person over a time frame. In this case, the assessment may be a determination of whether the single movement and the additional movements, together, constitute satisfactory or unsatisfactory behaviors related to moving the body.

In another illustrative embodiment, system 1600 may further include physical input device 1622. Physical input device 1622 may be configured to receive a plurality of movements of object 1618 and receive a user designation naming the plurality of movements. In this case, associative memory 1602 may be configured to be trained to recognize a future unknown movement of object 1618 based on a comparison of the user designation and the future unknown movement. This technique may reduce or avoid coding that normally would be necessary to recognize the future unknown movement.

The illustrative embodiments shown in FIG. 16 are not meant to imply physical or architectural limitations to the manner in which different illustrative embodiments may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

Figure 17:
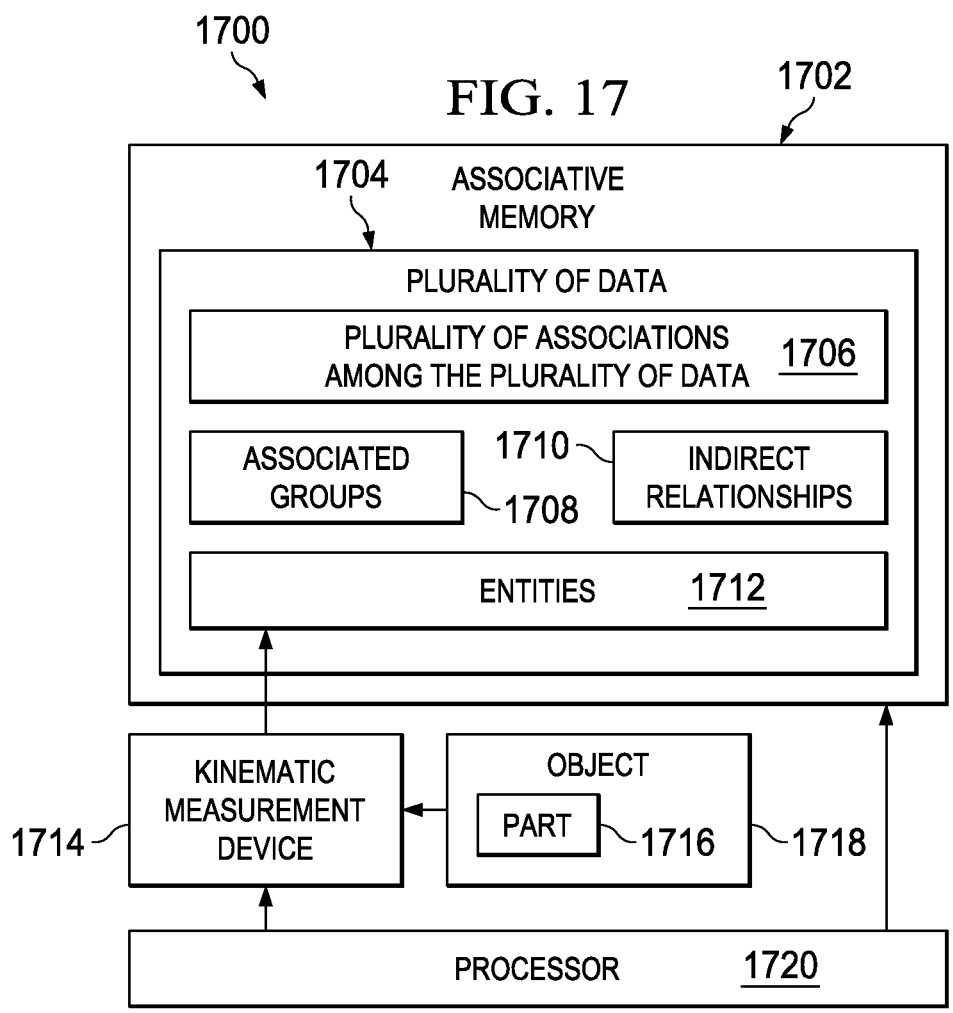
FIG. 17 is an example of a system, a computer including a kinematic measuring device, an associative memory, and a processor for converting kinematic data to qualitative names, in accordance with an illustrative embodiment.

FIG. 17 is an example of a system, a computer including a kinematic measuring device, an associative memory, and a processor for converting kinematic data to qualitative names, in accordance with an illustrative embodiment. System 1700 may be an example useful for implementing the processes and techniques described with respect to FIG. 1 through FIG. 14. System 1700 represents an alternative illustrative embodiment relative to system 1600 of FIG. 16.

System 1700 shown in FIG. 17 may be implemented using one or more data processing systems, possibly in a distributed or networked environment, and possibly by a group of remotely administered data processing systems known as the "cloud". Each of the one or more data processing systems that implement system 1700 may be data processing system 1800 described with respect to FIG. 18, or variations thereof. System 1700 may be characterized as including one or more blocks. Each of these blocks may be separate or may be part of a monolithic architecture.

System 1700 may include associative memory 1702. Associative memory 1702 may include plurality of data 1704 and plurality of associations among the plurality of data 1706. Plurality of data 1704 may be collected into associated groups 1708. Associative memory 1702 may be configured to be queried based on indirect relationships 1710 among plurality of data 1704 in addition to direct correlations among plurality of data 1704.

Associative memory 1702 may store entities 1712. Associative memory 1702 may also store relationships, both direct and indirect, among those entities 1712. Associative memory 1702 may also store individual information about each of entities 1712.

System 1700 may also include kinematic measurement device 1714. Kinematic measurement device 1714 may be configured to detect, quantitatively, a physical position of part 1716 of object 1718 by taking a quantitative measurement of object 1718.

System 1700 also may include processor 1720 in communication with kinematic measurement device 1714. Processor 1720 may be configured to translate the quantitative measurement to a qualitative description of the physical position. Processor 1720 may be further configured to compare the qualitative description to a set of movements for object 1718. Processor 1720 may be further configured to determine a particular movement of object 1718 based on the qualitative description.

The illustrative embodiment shown in FIG. 17 may be further varied. For example, the illustrative embodiments shown in FIG. 17 may be varied according to techniques similar to those described with respect to FIG. 16.

The illustrative embodiments shown in FIG. 17 are not meant to imply physical or architectural limitations to the manner in which different illustrative embodiments may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

Figure 18:
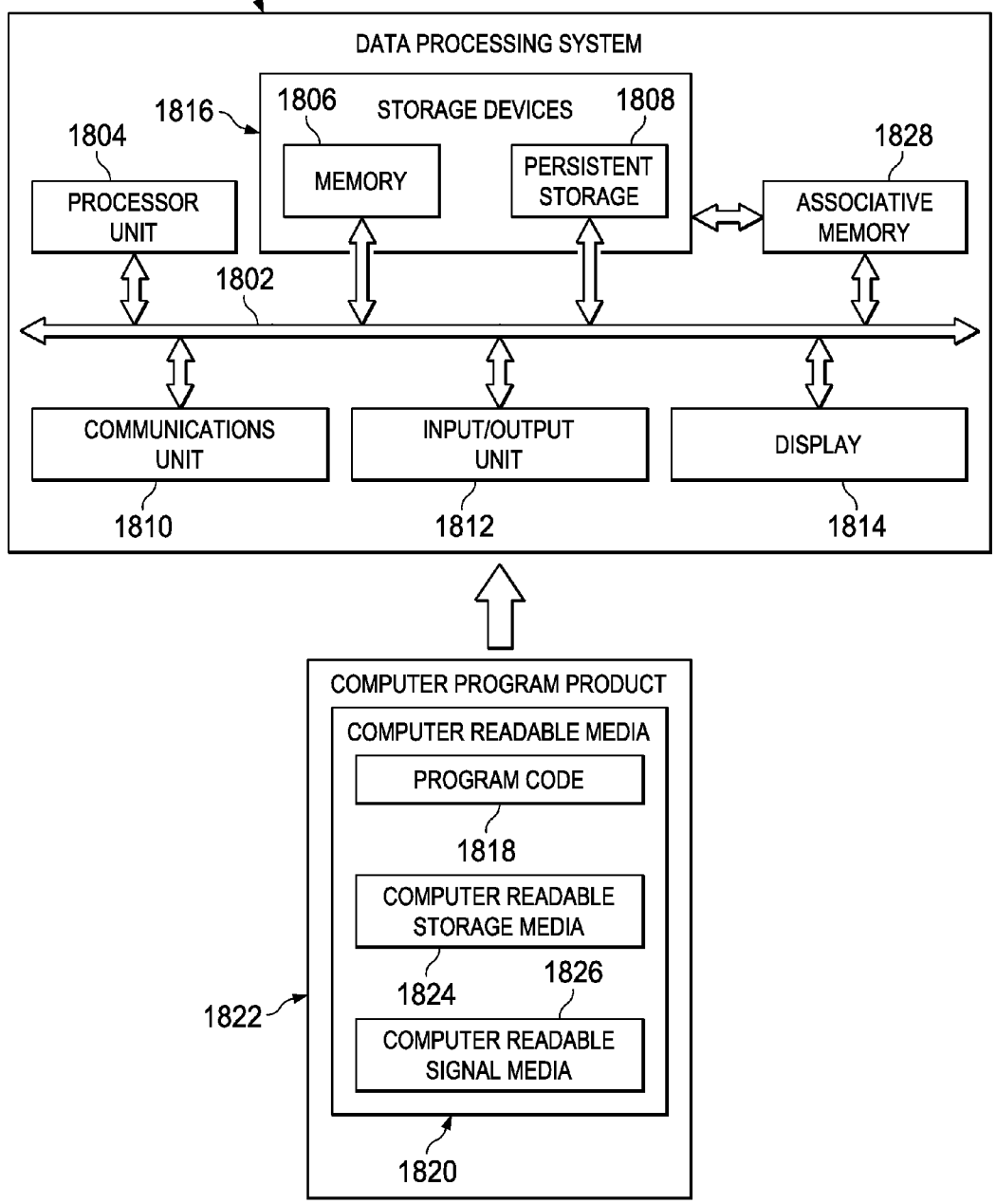
FIG. 18 is an illustration of a data processing system, in accordance with an illustrative embodiment.

Turning now to FIG. 18, an illustration of a data processing system is depicted in accordance with an illustrative embodiment. Data processing system 1800 in FIG. 18 is an example of a data processing system that may be used to implement the illustrative embodiments, such as motion sensing input device 100 of FIG. 1, processor 1204 or optional plug-in laptop 1220, of FIG. 12, processor 1620 of FIG. 16, processor 1720 of FIG. 17, or any other module or system or process disclosed herein. In this illustrative example, data processing system 1800 includes communications fabric 1802, which provides communications between processor unit 1804, memory 1806, persistent storage 1808, communications unit 1810, input/output (I/O) unit 1812, and display 1814.

Processor unit 1804 serves to execute instructions for software that may be loaded into memory 1806. This software may be any of the associative memories described elsewhere herein, or software for implementing the processes described elsewhere herein. Thus, for example, software loaded into memory 1806 may be software for executing process 1500 of FIG. 15 or implementing the five steps described above, or implementing the illustrative embodiments shown in FIG. 16 or FIG. 17. Processor unit 1804 may be a number of processors, a multi-processor core, or some other type of processor, depending on the particular implementation. A number, as used herein with reference to an item, means one or more items. Further, processor unit 1804 may be implemented using a number of heterogeneous processor systems in which a main processor is present with secondary processors on a single chip. As another illustrative example, processor unit 1804 may be a symmetric multi-processor system containing multiple processors of the same type.

Memory 1806 and persistent storage 1808 are examples of storage devices 1816. A storage device is any piece of hardware that is capable of storing information, such as, for example, without limitation, data, program code in functional form, and/or other suitable information either on a temporary basis and/or a permanent basis. Storage devices 1816 may also be referred to as computer readable storage devices in these examples. Memory 1806, in these examples, may be, for example, a random access memory or any other suitable volatile or non-volatile storage device. Persistent storage 1808 may take various forms, depending on the particular implementation.

For example, persistent storage 1808 may contain one or more components or devices. For example, persistent storage 1808 may be a hard drive, a flash memory, a rewritable optical disk, a rewritable magnetic tape, or some combination of the above. The media used by persistent storage 1808 also may be removable. For example, a removable hard drive may be used for persistent storage 1808.

Communications unit 1810, in these examples, provides for communications with other data processing systems or devices. In these examples, communications unit 1810 is a network interface card. Communications unit 1810 may provide communications through the use of either or both physical and wireless communications links.

Input/output (I/O) unit 1812 allows for input and output of data with other devices that may be connected to data processing system 1800. For example, input/output (I/O) unit 1812 may provide a connection for user input through a keyboard, a mouse, and/or some other suitable input device. Further, input/output (I/O) unit 1812 may send output to a printer. Display 1814 provides a mechanism to display information to a user.

Instructions for the operating system, applications, and/or programs may be located in storage devices 1816, which are in communication with processor unit 1804 through communications fabric 1802. In these illustrative examples, the instructions are in a functional form on persistent storage 1808. These instructions may be loaded into memory 1806 for execution by processor unit 1804. The processes of the different embodiments may be performed by processor unit 1804 using computer implemented instructions, which may be located in a memory, such as memory 1806.

These instructions are referred to as program code, computer usable program code, or computer readable program code that may be read and executed by a processor in processor unit 1804. The program code in the different embodiments may be embodied on different physical or computer readable storage media, such as memory 1806 or persistent storage 1808.

Program code 1818 is located in a functional form on computer readable media 1820 that is selectively removable and may be loaded onto or transferred to data processing system 1800 for execution by processor unit 1804. Program code 1818 and computer readable media 1820 form computer program product 1822 in these examples. In one example, computer readable media 1820 may be computer readable storage media 1824 or computer readable signal media 1826. Computer readable storage media 1824 may include, for example, an optical or magnetic disk that is inserted or placed into a drive or other device that is part of persistent storage 1808 for transfer onto a storage device, such as a hard drive, that is part of persistent storage 1808. Computer readable storage media 1824 also may take the form of a persistent storage, such as a hard drive, a thumb drive, or a flash memory, that is connected to data processing system 1800. In some instances, computer readable storage media 1824 may not be removable from data processing system 1800.

Alternatively, program code 1818 may be transferred to data processing system 1800 using computer readable signal media 1826. Computer readable signal media 1826 may be, for example, a propagated data signal containing program code 1818. For example, computer readable signal media 1826 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 1818 may be downloaded over a network to persistent storage 1808 from another device or data processing system through computer readable signal media 1826 for use within data processing system 1800. For instance, program code stored in a computer readable storage medium in a server data processing system may be downloaded over a network from the server to data processing system 1800. The data processing system providing program code 1818 may be a server computer, a client computer, or some other device capable of storing and transmitting program code 1818.

The different components illustrated for data processing system 1800 are not meant to provide architectural limitations to the manner in which different embodiments may be implemented. The different illustrative embodiments may be implemented in a data processing system including components in addition to or in place of those illustrated for data processing system 1800. Other components shown in FIG. 18 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 1804 may take the form of a hardware unit that has circuits that are manufactured or configured for a particular use. This type of hardware may perform operations without needing program code to be loaded into a memory from a storage device to be configured to perform the operations.

For example, when processor unit 1804 takes the form of a hardware unit, processor unit 1804 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 1818 may be omitted because the processes for the different embodiments are implemented in a hardware unit.

In still another illustrative example, processor unit 1804 may be implemented using a combination of processors found in computers and hardware units. Processor unit 1804 may have a number of hardware units and a number of processors that are configured to run program code 1818. With this depicted example, some of the processes may be implemented in the number of hardware units, while other processes may be implemented in the number of processors.

As another example, a storage device in data processing system 1800 is any hardware apparatus that may store data. Memory 1806, persistent storage 1808, and computer readable media 1820 are examples of storage devices in a tangible form.

In another example, a bus system may be used to implement communications fabric 1802 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 1806, or a cache, such as found in an interface and memory controller hub that may be present in communications fabric 1802.

Data processing system 1800 may also include associative memory 1828. Associative memory 1828 may be associative memory 1602 of FIG. 16 or associative memory 1702 of FIG. 17, or other associative memories described elsewhere herein, and may have the properties described elsewhere herein. Associative memory 1828 may be in communication with communications fabric 1802. Associative memory 1828 may also be in communication with, or in some illustrative embodiments, be considered part of storage devices 1816. While one associative memory 1828 is shown, additional associative memories may be present.

The different illustrative embodiments can take the form of an entirely hardware embodiment, an entirely software embodiment, or an embodiment containing both hardware and software elements. Some embodiments are implemented in software, which includes but is not limited to forms, such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non-limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD.

Further, a computer usable or computer readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems or remote printers or storage devices through intervening private or public networks. Non-limiting examples of modems and network adapters are just a few of the currently available types of communications adapters.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A system comprising:
a kinematic measurement device having one or more sensors configured to detect a plurality of physical positions of a part of an object;
an associative memory, in communication with the kinematic measurement device, and comprising a plurality of data and a plurality of associations among the plurality of data, wherein the plurality of data is collected into associated groups, wherein the associative memory is configured to be queried based on at least indirect relationships among the plurality of data;
a processor, in communication with the associative memory and the kinematic measurement device, and configured to:
translate a range of coordinate positions of the part of the object to a qualitative description that names the range;
provide the qualitative description to the associative memory for storage;
translate a plurality of additional ranges of corresponding sets of coordinate positions of additional parts of the object to corresponding additional qualitative descriptions that name the plurality of additional ranges, wherein the processor is further configured to provide the corresponding additional qualitative descriptions to the associative memory for storage; and
wherein the processor in conjunction with the associative memory is further configured to output an assessment of the object based on a combination of the qualitative description and the corresponding additional qualitative descriptions.

2. The system of claim 1, wherein the assessment comprises a comparison of the qualitative description to a set of pre-determined qualitative descriptions, the set of pre-determined qualitative descriptions having corresponding qualitative descriptions of movements of the object, and wherein the output further comprises a particular pre-determined qualitative description of a movement of the object that most closely matches the qualitative description.

3. The system of claim 2, wherein the processor is further configured to modify the comparison based on a criteria selected by a user.

4. The system of claim 1, wherein the object is a person, the part is a body part, and the additional parts are additional body parts.

5. The system of claim 4, wherein the qualitative description is a position of the body part and the corresponding additional qualitative descriptions are other positions of the additional body parts.

6. The system of claim 5, wherein the assessment based on a criterion is a determination of whether a combination of the position and the other positions is one of satisfactory or unsatisfactory.

7. The system of claim 5, wherein the position and the other positions together comprise a single movement of a body of the person.

8. The system of claim 7, wherein the kinematic measurement device, associative memory, and processor are further configured to take additional movements of the body of the person over a time frame.

9. The system of claim 8, wherein the assessment based on a criterion is a determination of whether the single movement and the additional movements, together, constitute behaviors related to moving the body that are one of satisfactory and unsatisfactory.

10. The system of claim 1 further comprising a physical input device configured to receive a plurality of movements of the object, receive a user designation naming the plurality of movements, and wherein the associative memory is configured to be trained to recognize a future unknown movement of the object based on a comparison of the user designation and the future unknown movement, whereby coding to recognize the future unknown movement is avoided.

11. A method comprising:
detecting, quantitatively, a physical position of a part of an object using a kinematic measurement device, wherein a quantitative measurement is taken;
translating, using a processor in communication with the kinematic measurement device, the quantitative measurement to a qualitative description of the physical position;
providing the qualitative description to an associative memory comprising a plurality of data and a plurality of associations among the plurality of data, wherein the plurality of data is collected into associated groups, wherein the associative memory is configured to be queried based on at least indirect relationships among the plurality of data, the associative memory embodied on a non-transitory computer readable storage medium;

comparing, using the processor in conjunction with the associative memory, the qualitative description to a set of movements for the object; and determining, using the processor in conjunction with the associative memory, a particular movement of the object based on the qualitative description.

12. The method of claim 11, further comprising:

determining, using the processor in conjunction with the associative memory and based on a criterion, whether the particular movement is one of satisfactory or unsatisfactory.

13. The method of claim 12 further comprising:

responsive to a determination that the particular movement is unsatisfactory, providing an alert to a user.

14. The method of claim 12 further comprising:

responsive a determination that the particular movement is satisfactory, providing an indication to a user that the particular movement is satisfactory.

15. The method of claim 11, wherein the object comprises a body part of a person, wherein the particular movement is a movement of the body of the person, and wherein the method further comprises:

responsive to a determination that the particular movement is unsatisfactory, providing an alert to the person.

16. The method of claim 11, further comprising:

receiving a user criteria from an input device in communication with the processor, wherein determining the particular movement is modified based on the user criteria.

* * * * *